(12) United States Patent
Brinkerhoff

(10) Patent No.: US 7,345,987 B2
(45) Date of Patent: Mar. 18, 2008

(54) OPTICAL DISC WHICH STORES DIGITAL INFORMATION IN INFORMATIONAL UNITS WHICH DIFFRACT A LINE OF LASER LIGHT AT ONE OF 1024 ANGLES AND A CORRESPONDING LIGHT DETECTING APPARATUS FOR REPRODUCING INFORMATION FROM SAID OPTICAL DISC

(76) Inventor: Kenley Earl Brinkerhoff, 3087 S. Chestnut Cir., St. George, UT (US) 84790

( * ) Notice: Subject to any disclaimer, the term of this patent is extended or adjusted under 35 U.S.C. 154(b) by 492 days.

(21) Appl. No.: 10/348,509

(22) Filed: Jan. 21, 2003

(65) Prior Publication Data
US 2004/0141451 A1 Jul. 22, 2004

(51) Int. Cl.
G11B 7/24 (2006.01)
G11B 7/00 (2006.01)

(52) U.S. Cl. ............................. 369/275.4; 369/109.02

(58) Field of Classification Search .................. 369/95, 369/103, 59.24, 109.02, 275.4, 292
See application file for complete search history.

(56) References Cited

U.S. PATENT DOCUMENTS 5,359,591 A * 10/1994 Nomoto .................. 369/275.4
5,371,721 A * 12/1994 Greidanus et al. ....... 369/13.14
5,467,339 A * 11/1995 Nakajima et al. ......... 369/275.4
5,570,338 A * 10/1996 Toda et al. ............ 369/109.02
5,572,508 A * 11/1996 Satoh et al. ............. 369/44.26
5,617,389 A * 4/1997 Satoh et al. ............. 369/275.4
5,761,175 A * 6/1998 Tagiri et al. ........... 369/109.02
5,901,124 A * 5/1999 Kobayashi et al. ...... 369/47.31
6,351,339 B1 * 2/2002 Bar-Gadda .................... 360/55
6,535,343 B1 * 3/2003 Bar-Gadda .................... 360/55

FOREIGN PATENT DOCUMENTS

JP 2000276732 A * 10/2000

* cited by examiner

Primary Examiner—William J Klimowicz

(57) ABSTRACT

The present invention includes an optical disc whose informational units each contain a raised pad designed to reflect laser light at a compound angle which is 45 degrees from the disc surface and at one of 1024 preset angles between 0 and 360 degrees (with 0 degrees being oriented radially towards the disc center). Light reflected from the information units intersects with a ring of light detecting receptors arranged circumferentially around the laser/light source. When individual receptors are struck by reflected laser light: a signal is sent to a processor. This processor determines the order in which the receptors are stuck and outputs integers. Each integer corresponds to the receptor that was struck and this data, when streamed sequentially, reproduces the data stored on the optical disc.

3 Claims, 6 Drawing Sheets

Octal Division

Laser light reflected from a pad on the DDD surface is reflected to one of the sections above and strikes one of the groups of heads in the receptor ring. The output is integer 'x' (any number between 1 and 8), corresponding to the section struck by the reflected light.

CD diagram

In this diagram, the laser light strikes a stripe on the CD surface and is reflected back toward the laser source. The light is then reflected to the receptor by the mirror and the output is a binary '1'

Prior Art

CD diagram

— CD Surface

Mirror

Receptor

Laser

In this diagram, the laser light strikes a pit on the CD surface and is scattered. No light is reflected to the receptor and the output is a binary '0'.

Prior Art

DDD diagram
(side view)

In this diagram, the laser light strikes a pad on the DDD surface and is reflected to one of the heads in the receptor ring. The output is integer 'x' (any number between 1 and 1024), corresponding to the receptor struck by the reflected light.
(Also note that the binary receptor is still present for handshaking and backward compatibility)

DDD laser assembly diagram (top view)

In this diagram, as with diagram 3, the laser light strikes a pad on the DDD surface and is reflected to one of the heads in the receptor ring. The output is integer 'x' (any number between 1 and 1024), corresponding to the receptor struck by the reflected light.

Figure 5
Reflection variances
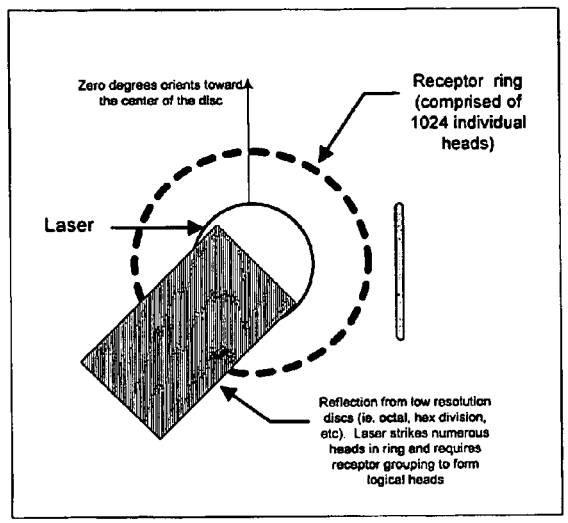
Figure 5 a
Low resolution
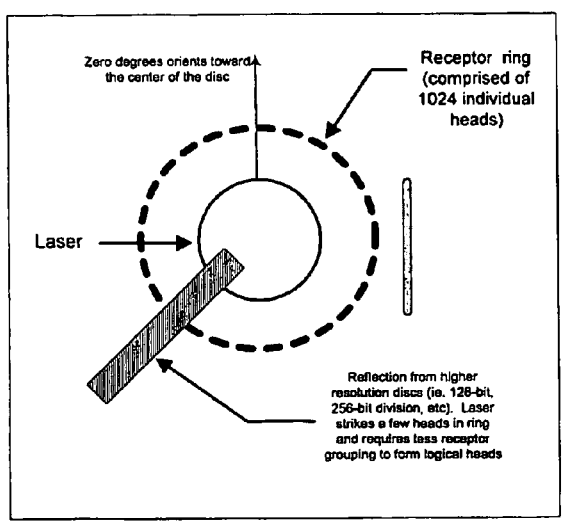
Figure 5 b
higher resolution
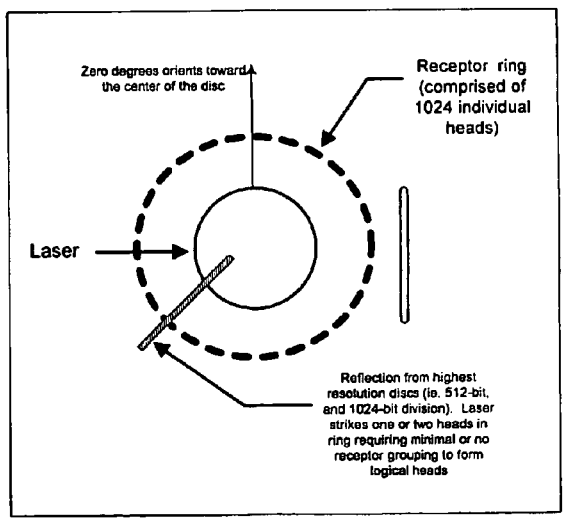
Figure 5 c
highest resolution

Octal Division

Laser light reflected from a pad on the DDD surface is reflected to one of the sections above and strikes one of the groups of heads in the receptor ring. The output is integer 'x' (any number between 1 and 8), corresponding to the section struck by the reflected light.

OPTICAL DISC WHICH STORES DIGITAL INFORMATION IN INFORMATIONAL UNITS WHICH DIFFRACT A LINE OF LASER LIGHT AT ONE OF 1024 ANGLES AND A CORRESPONDING LIGHT DETECTING APPARATUS FOR REPRODUCING INFORMATION FROM SAID OPTICAL DISC

BACKGROUND OF THE INVENTION

1. Field of Invention

The invention relates to optical discs used to store digital information and corresponding optical discs drives used to reproduce data from such discs.

2. Description of Prior Art

The optical disc and corresponding disc reading apparatus of the present invention are a divergence from other forms of laser read optical media including optical discs such as the Video Disc, the Compact Disc (CD-ROM) with associated drive and the Digital Video Disc (DVD-ROM) with its associated drive. A brief description of these will be set forth in the following paragraphs.

Compact discs (CDs) or Compact Disc-Read Only Memory (CD-ROM) are currently available with a capacity of 640 M bytes. The CD-ROM drive reads data in binary format from a number of pits and stripes arranged on the reflective surface of the compact disc (CD). If the laser signal strikes a stripe on the CD surface and is reflected back toward the source it is routed to a receptor head and interpreted as the number 1. If the signal is not reflected back (due to the presence of a pit on the surface of the disc) and is not routed to the receptor head, the output is a 0. In this manner, data is encoded onto the disc in binary format. (See FIGS. 1 and 2)

Digital Video Discs (DVDs) have an increased capacity over CDs, storing up to 4.7 G bytes of data per disc. The drive still reads in binary, as with its CD predecessor, however, the DVD achieves the much larger capacity by placing the data pits on the disc surface closer together and by arranging them such that two different wavelengths of laser light read two separate layers of data. DVDs function much the same as CDs in that the laser light is directed at the surface of the disc and if reflected back toward the source a 1 is interpreted and if not reflected a 0 is interpreted, thus storing and retrieving data in binary format. (Similar to the CD illustrated in FIGS. 1 and 2)

Subsequent to the drives described previously, optical discs have been designed which store digital information in a plurality of pits within a single informational unit, instead of a single pit (or the absence thereof) in each informational unit on the disc. By creating varied patterns of pits, the light reflected back from the disc creates patterns of light intensity that are interpreted to reproduce the data from the disc. Diffraction gratings have also been used to reflect incident light to a number of receptors.

The present invention differs from prior art in that it uses raised pads to store information rather than pits (whether singular in each informational unit or plural) or diffraction gratings which allows the present invention to reflect light to an exponentially larger number of receptors. It also diverges from previous inventions in its use of a receptor ring that surrounds and is attached to the laser light source and moves with the said source in order to maintain constant distance and angle between the light source, the informational unit being read from the disc surface and the receptors in the ring. And lastly, the present invention differs from previous inventions in that the receptors in the ring are dynamically interpreted by a processor and can be combined to form logical receptors as noted in claim 8 of the present invention.

Other optical discs have been patented which store digital information in a plurality of pits within a single informational unit, instead of a single pit (or the absence thereof) in each informational unit on the discs. By creating varied patterns of pits, the light reflected back from the disc creates patterns of light intensity that are interpreted to reproduce the data from the disc.

Others have used diffraction gratings to reflect incident light to a number of receptors. The present invention differs from prior art in that it uses raised pads to store information rather than pits (whether singular in each informational unit of plural) or diffraction gratings. It also diverges from previous inventions in its use of a receptor ring that surrounds and is attached to the laser light source and moves with the said source in order to maintain constant distance and angle between the light source, the informational unit being read from the disc surface and the receptors in the ring. And lastly, the present invention differs from previous inventions in that the receptors in the ring are dynamically interpreted by a processor and can be combined to form logical receptors as noted in claim 3 of the present invention.

The object of the present invention is to set forth an optical disc device (and associated optical disc) that is capable of reading data that is stored in higher level number systems (Octal, Hexadecimal. etc. up to 1 kbit or higher) in order to store data very densely on the disc by utilizing a raised pad, rather than a pit or pattern of pits, in each of the informational units on the disc. These raised pacts reflect light in a straight line at one of 1024 angles so as to strike one (or a logical grouping) of the 1024 receptors in a receptor ring that is arranged circumferentially around and attached to the laser source. The receptor ring moves with tile laser light source as it moves in its path radially along the disc surface and maintains constant distances between the light source, the disc surface (and informational units thereon) and the receptor ring.

The second object of the present invention is to provide an apparatus for reproducing information from the disc noted in the first object, by sequentially irradiating the raised pads in the information units on the disc with laser light and by detecting the light reflected back from these raised pads to a ring of receptors that is arranged circumferentially around the laser light source and attached to the same source so that it moves with the light source as the disc is read. When a receptor in this ring is irradiated by light reflected from the disc, a signal is sent to a processor which outputs an integer that corresponds to the individual receptor that generated the signal. Therefore the angle of reflection of each pad on the disc corresponds to a particular receptor in the ring, which when irradiated generates a signal that causes the processor to output an integer corresponding to the receptor. Thus, due to the angle of each pad, each informational unit stores an integer that can be read and output sequentially by the apparatus.

It is the third object of the present invention to provide an apparatus according to the second object which combines groups of adjacent receptors to form logical receptors in order to increase the size of the receptor to decrease the complexity (and associated production expenses and intricacies) but which also decreases the overall capacity of the disc. This is done by the processor (noted in the preceding paragraph), which determines the order in which receptors are irradiated with light. When combining physical receptors into logical receptors, the processor accepts signals from any receptor in a logical group as being from a single receptor and outputs an integer associated with the group rather than the integer associated with tile individual receptor. Thus a number of physical receptors are combined to form a single logical receptor dynamically.

SUMMARY OF THE INVENTION

According to the present invention, an optical disc is used to store data that is read by a laser in much the same way as with previous optical discs. However, according to the present invention, the data locations on the disc surface are raised pads that reflect the laser light at a compound angle comprised of the following two angles
1. An angle of 45° from the disc surface.
2. At one of several pre-set angles from the center of the laser read head (with zero degrees oriented toward the center of the disc).

The number of pre-set angles determines the number of variables that can be stored at each data location on the disc. On discs storing data in the octal number system there are 8 pre-set angles, on discs storing data in hexadecimal there are 16 pre-set angles, and so on.

The disc drive used to read from the said optical media, according to the present invention, contains a ring of receptors that is arranged concentrically around the laser light source and is attached to this laser source so as to move with it and remain at a constant distance from the laser source and at a constant distance from the disc surface. There are 1024 individual receptors that can act separately or that can be grouped to form larger logical heads (grouping to form logical receptors is described in greater detail in the following section). In this manner, if the optical disc being read contains data stored with 1024 pre-set angles, the drive utilizes each of the 1024 receptors individually. If the disc being read by the drive contains data stored with 8 preset angles, groups of adjacent heads combine to form 8 logical receptors. Thus the disc and chive are able to store and retrieve data in any number system from octal (8-bit) to 1024 (1 kilobit).

Receptor Grouping/Logical Receptors

As mentioned above, the ring of 1024 receptors is dynamic and can act as 1024 individual receptors or can combine adjacent receptors into groups to form logical receptors (or heads). This dynamic grouping allows the drive to read discs with varying capacities and provides manufacturers with production cost options. Discs with smaller amounts of data can utilize lower number systems and costs can be lowered, and discs that contain greater amounts of data can justify the cost of utilizing higher systems.

The drive can dynamically combine adjacent to heads to form 8, 16, 32, 64, 128, 256 or 512 logical receptors according to the following.

8 logical heads are formed by combining groups of 128 adjacent receptors into each logical receptor. The particular receptors (or heads) that are contained in each group and the location of the group in degrees from the laser center (with zero oriented toward the disc center) are outlined in TABLE 1 and illustrated in FIG. 6.

16 logical heads are formed by combining groups of 64 adjacent receptors into each logical receptor. The particular receptors (or heads) that are contained in each group and the location of the group in degrees from the laser center (with zero oriented toward the disc center) are outlined in TABLE 2.

32 logical heads are formed by combining groups of 32 adjacent receptors into each logical receptor. The particular receptors (or heads) that are contained in each group and the location of the group in degrees from the laser center (with zero oriented toward the disc center) are outlined in TABLE 3.

64 logical heads are formed by combining groups of 16 adjacent receptors into each logical receptor. The particular receptors (or heads) that are contained in each group and the location of the group in degrees from the laser center (with zero oriented toward the disc center) are outlined in TABLE 4.

128 logical heads are formed by combining groups of 8 adjacent receptors into each logical receptor. The particular receptors (or heads) that are contained in each group and the location of the group in degrees from the laser center (with zero oriented toward the disc center) are outlined in TABLE 5.

256 logical heads are formed by combining groups of 4 adjacent receptors into each logical receptor. The particular receptors (or heads) that are contained in each group and the location of the group in degrees from the laser center (with zero oriented toward the disc center) are outlined in TABLE 6.

512 logical heads are formed by combining groups of 2 adjacent receptors into each logical receptor. The particular receptors (or heads) that are contained in each group and the location of the group in degrees from the laser center (with zero oriented toward the disc center) are outlined in TABLE 7.

1024 heads are available if each receptor acts as an individual head. The locations of the individual heads in degrees from the laser center (with zero oriented toward the disc center) are outlined in Table 8.

Accordingly therefore, as a point of example, if a disc contains data written in the above said 8-bit format and laser light is reflected from the disc surface at some angle between 0 and 44 degrees, striking the receptor ring in the range of receptors 0-127, the output of the drive would be 1. And if the laser light is reflected at some angle between 45 and 89 degrees striking the receptor ring in the range of receptors 128-255 the output would be a 2. And so on for each logical location according to Table 1.

Expandability

Since the Dynamic Disc derives its increased capacity from the large number of variables possible at each data location on the disc, the overall capacity of the disc (and drive) can be expanded by increasing the number of receptor heads in the receptor ring (ie to 2048, 4096, etc), and correspondingly creating discs that reflect more highly focused and directed laser light to strike the increased number of receptors. And if technology becomes such that the laser can be reflected as a fine dot rather than as a line, several concentric rings of receptors could be placed around the laser, increasing the capacity and capabilities of the disc astronomically.

| Disc resolution | Number length | Possible Combinations |
| --- | --- | --- |
| Binary (CD/DVD) | 40-bit | $2^{40}$ or $1.1 \times 10^{12}$ |
| | 128-bit | $2^{128}$ or $3.4 \times 10^{38}$ |
| Octal | 40-bit | $8^{40}$ or $1.3 \times 10^{36}$ |
| | 128-bit | $8^{128}$ or $3.9 \times 10^{115}$ |

-continued

| Disc resolution | Number length | Possible Combinations |
|---|---|---|
| 32-bit | 40-bit | $32^{40}$ or $1.6 \times 10^{60}$ |
|  | 128-bit | $32^{128}$ or $4.6 \times 10^{192}$ |
| 1024 | 40-bit | $1024^{40}$ or $2.6 \times 10^{120}$ |
|  | 128-bit | $1024^{128}$ or $2.1 \times 10^{385}$ |

Software Driver

The Dynamic Disc Drive reads the data from the Dynamic Drive Disc and sends only integers to the computer for processing. Decoding of the integers from the drive takes place on the computer (not on the Dynamic Drive). This allows software drivers to interpret the same data differently from different discs. The software component of the DDD driver will contain interpretive sets. For example, the number 672 sent from a C++ program disc in the DDD to the computer could represent a C++ command or subroutine while the same number (672) coming from a computer game DDD could represent the movement of a character, or a particular command relative to the games code. The possibilities are virtually innumerable.

Additional interpretive sets could be added dynamically to the driver for new additions from particular vendors who wish to capitalize on the new technology by creating their own sets. If the set on the disc is not part of the driver currently loaded, the set could be copied from the disc to the driver or downloaded from the internet and added to the driver. The interpretive set used to decode any particular disc is determined during the handshaking session between the Dynamic Disc and the Dynamic Drive when the disc is first inserted into the drive. Handshaking will be discussed in more detail hereafter.

Handshaking

Since there are to be numerous interpretive sets used to decode the DDD data, and there are numerous disc resolutions possible on the DDD, a handshaking session is necessary. When the Dynamic disc is first inserted into the Dynamically Divisible Drive, the drive reads the first few rings of data which are written in binary format. The data contained in the said rings indicates whether or not the disc is a Dynamic Drive Disc. If there is no handshaking data then the drive recognizes the disc as a CD or a DVD. If handshaking data is encountered, the drive reads the data to determine the following:

1. The disc resolution.
    The drive determines whether the DDD contains 8, 16, 32, 64, 128, 256, 512, or 1024 bit data and groups the receptors into logical heads accordingly.
2. The interpretive set to be used.
    As mentioned above, various interpretive sets can be used to interpret the integers sent from the disc to the computer. The handshaking session determines which set is to be used for the particular disc in the drive.
3. Where a non-standard interpretive set can be found.
    If the set to be used is not one of the standard sets included with the original driver, the disc handshaking will indicate if its interpretive set is included on the disc in binary format to be copied to the driver on the computer or will give the location for downloading the set from the manufacturer.

The drive is thereby able to determine the properties of each individual disc inserted and manufacturers are presented with the freedom to develop sets that meet the need of their particular industry.

Dynamic Drive Disc

The Dynamic Drive Disc is similar to its predecessors (CD and DVD) in that it is made of a plastic disc with a reflective coating covered by a protective finish. The reflective coating may be a malleable substance that can be stamped with the various reflective pads in a manner opposite to the pits and stripes are stamped into other optical discs. Rather than stamping holes or concave shapes into the disc surface, the area around tile reflective pad is depressed leaving a raised pad in the informational unit which directs light away from the laser source to the ring of receptors arranged around the laser. Or the disc surface may consist of a material that can be engraved by a highly focused laser system designed specifically for writing to tile disc media of the present invention.

DESCRIPTION OF THE DRAWINGS

The figures contained herein are intended to illustrate the concepts outlined in the present invention and are not and weren't intended as representations of the actual devices described.

The laser light is reflected outward from the disc surface in a line that strikes an area on the receptor ring. The receptor (or receptors) struck output an integer. The integer varies according to the logical grouping used. Angles for the locations of these groups, the receptors or heads in each group and the corresponding output (integer) are found in Tables 1 through 8.

FIG. 5 illustrates the various reflection patterns produced by discs containing different number systems.

FIG. 5a illustrates the broad, less focused pattern of an octal or a hexadecimal type disc. The broad pattern requires the combination of large numbers of receptors into logical heads to avoid overlap and error.

FIG. 5b illustrates a more highly focused pattern that would be typical of the mid-range discs (128-bit to 256-bit discs, for example). The narrower pattern still requires the combination of receptors into logical heads, but because it is much narrower than the previous example, less receptors are required for each logical group allowing for a larger number of groups.

FIG. 5c illustrates an even more highly focused pattern that would be typical of the highest capacity discs (512-bit and 1024-bit). The highly focused pattern strikes only one or two receptors requiring minimal or no grouping of receptors.

Figure 1:
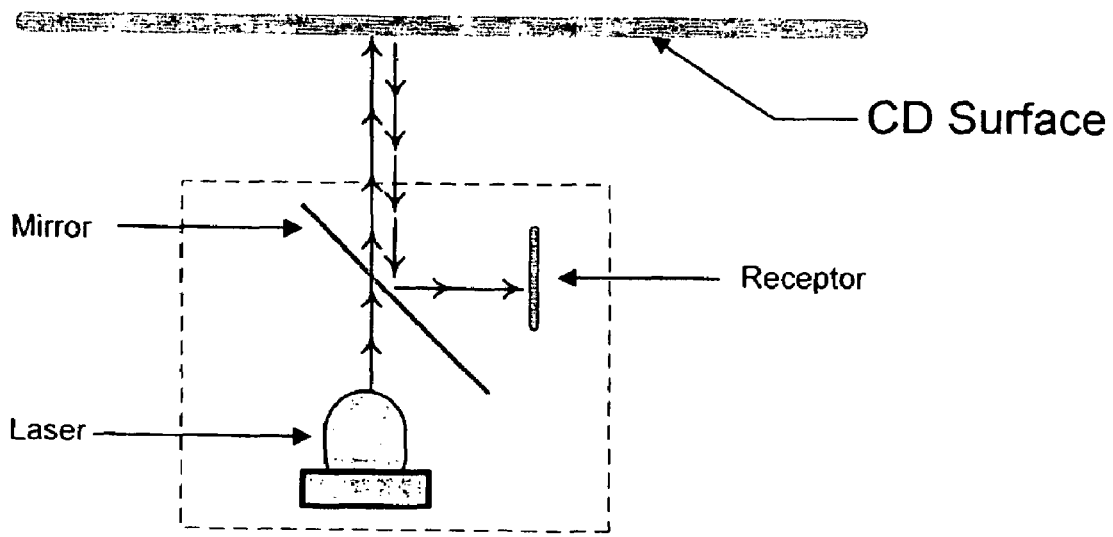
FIG. 1 illustrates the basic operation of the legacy compact disc in which the laser is directed at the surface of the optical disc which reflects the laser back toward the source (due to the presence of a stripe on the disc surface). The laser is then routed by a mirror to a receptor and the output of the read cycle is a binary 1.
Figure 2:
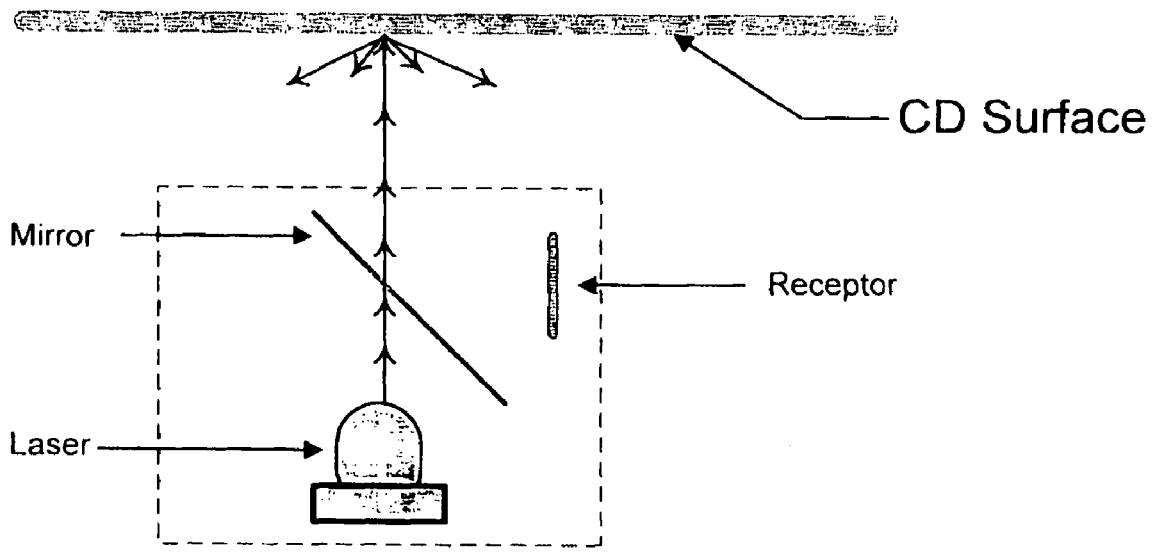
FIG. 2 also illustrates the basic function of the legacy compact disc, however, in this illustration the laser is scattered by the presence of a pit on the disc surface. No light is directed to the receptor and the output of the read cycle is a binary 0.
Figure 3:
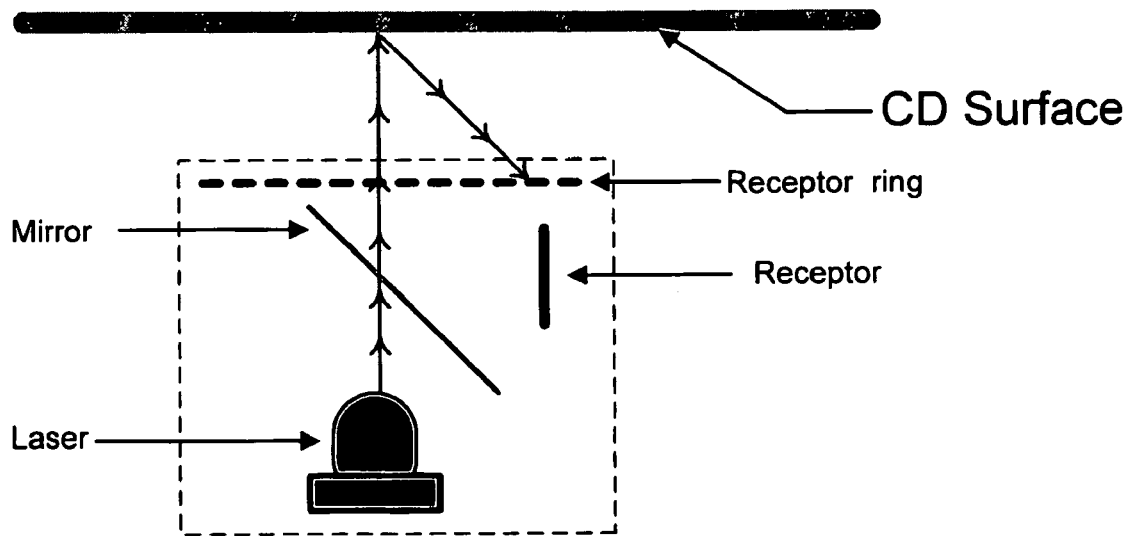
FIG. 3 illustrates the basic function of the Dynamic Disc Drive. Laser light is directed at the surface of the disc and is reflected to one of the receptors in the receptor ring. In contrast to FIGS. 1 and 2 there are numerous possible receptors to which the laser can be directed (only one of the numerous possible reflections is shown). The output for this read cycle is the integer that corresponds with the receptor that was struck by the reflected laser light. Also note that the binary receptor is still present allowing for backward compatibility enabling the drive to read compact and digital versatile discs in addition to the Dynamic Drive Discs.
Figure 4:
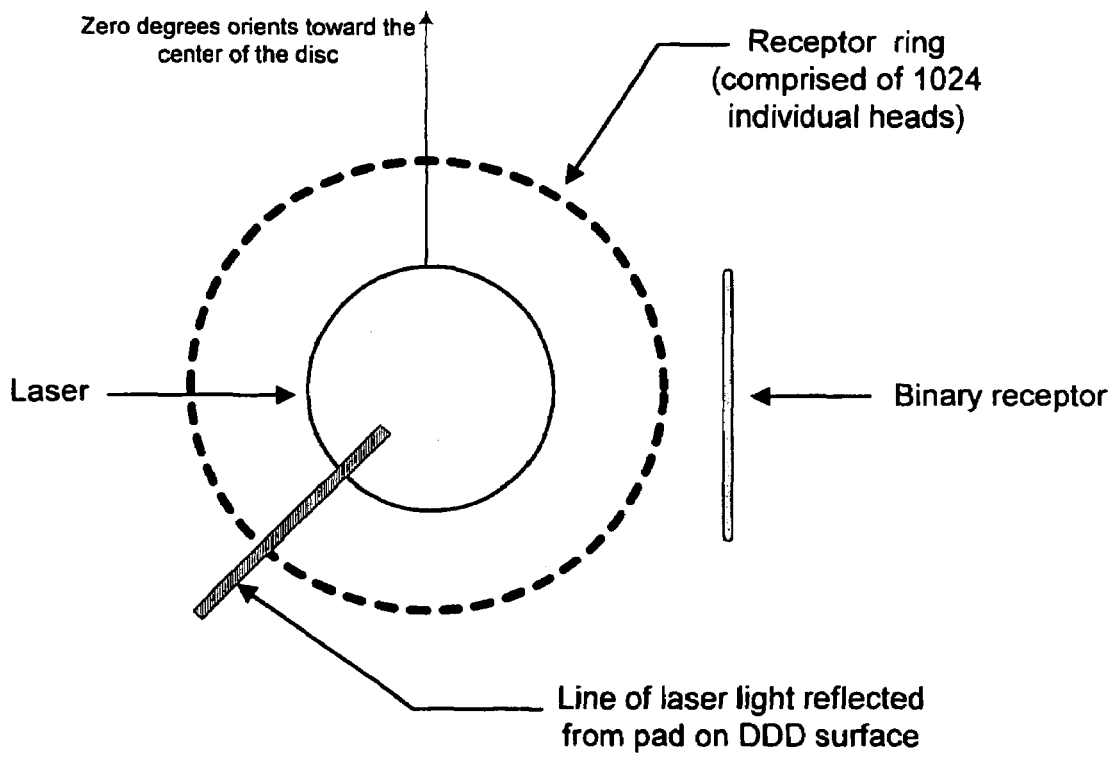
FIG. 4 illustrates a simplified top view of the Dynamic Drive laser and receptor ring.
Figure 6:
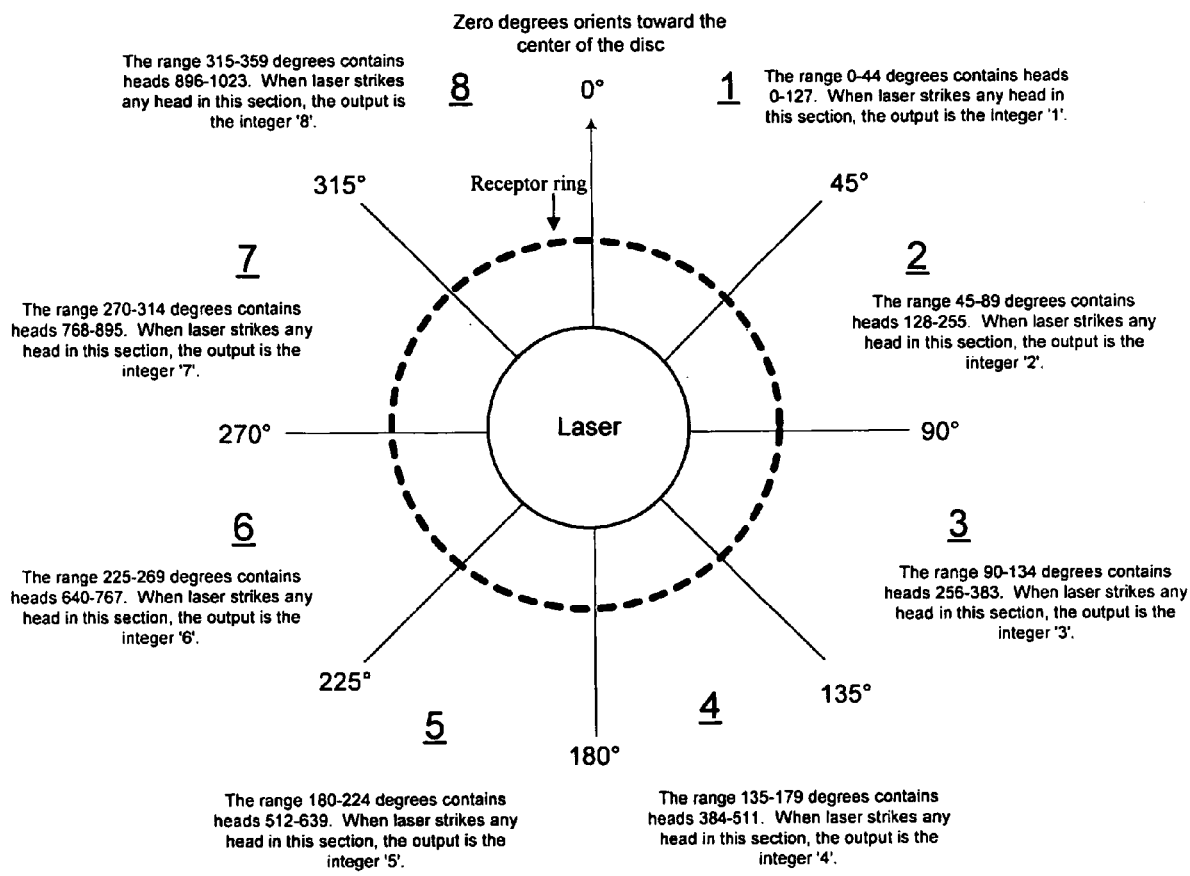

FIG. 6 is a graphical representation of the data in Table 1. The laser is in the center surrounded by the ring of 1024 receptor heads. Section 1 is from 0 to 44 degrees and is comprised of heads 0 through 127. If laser light is directed to any of the receptors in this section from the disc surface, the output for the read cycle is a 1. Each subsequent section contains the location in degrees, the heads contained in the group and the corresponding output for that section.

DESCRIPTION OF THE TABLES

Eight tables are included herewith. The tables indicate the location of the logical receptors for each possible subdivision of the receptor ring. The location is given in a range of degrees from 0 to 359 with 0 oriented toward the center of the disc. The tables also note which of the 1024 heads in the receptor ring are included in each logical head. The heads are numbered with head 0 being the head at 0 degrees (in a straight line from the center of the laser head to the center of the disc).

The tables are as follows:
TABLE 1 outlines the 8-bit division of the ring
TABLE 2 outlines the 16-bit division of the ring
TABLE 3 outlines the 32-bit division of the ring
TABLE 4 outlines the 64-bit division of the ring
TABLE 5 outlines the 128-bit division of the ring
TABLE 6 outlines the 256-bit division of the ring
TABLE 7 outlines the 512-bit division of the ring
TABLE 8 outlines the 1024-bit division of the ring

TABLE 1

8-bit Division

| Integer sent to processor | logical head location (degrees from center) | Heads in Group (128 head grouping = 1 logical head) |
|---|---|---|
| 0 | None (0 = no reflection) | None |
| 1 | 0-44 degrees | Heads 0-127 |
| 2 | 45-89 degrees | heads 128-255 |
| 3 | 90-134 degrees | heads 256-383 |
| 4 | 135-179 degrees | heads 384-511 |
| 5 | 180-224 degrees | heads 512-639 |
| 6 | 225-269 degrees | heads 640-767 |
| 7 | 270-314 degrees | heads 768-895 |
| 8 | 315-359 degrees | heads 896-1023 |

TABLE 2

16-bit Division

| Integer sent to processor | logical head location (degrees from center) | Heads in Group (64 head grouping = 1 logical head) |
|---|---|---|
| 0 | No reflection from disk | None |
| 1 | 0-22 degrees | Heads 0-63 in group |
| 2 | 22.5-44.5 degrees | Heads 64-127 in group |

TABLE 2-continued 16-bit Division

| Integer sent to processor | logical head location (degrees from center) | Heads in Group (64 head grouping = 1 logical head) |
|---|---|---|
| 3 | 45-67 degrees | Heads 128-191 in group |
| 4 | 67.5-89.5 degrees | Heads 192-255 in group |
| 5 | 90-112 degrees | Heads 256-319 in group |
| 6 | 112.5-134.5 degrees | Heads 320-383 in group |
| 7 | 135-157 degrees | Heads 384-447 in group |
| 8 | 157.5-179.5 degrees | Heads 448-511 in group |
| 9 | 180-202 degrees | Heads 512-575 in group |
| 10 | 202.5-224.5 degrees | Heads 576-639 in group |
| 11 | 225-247 degrees | Heads 640-703 in group |
| 12 | 247.5-269.5 degrees | Heads 704-767 in group |
| 13 | 270-292 degrees | Heads 768-831 in group |
| 14 | 292.5-314.5 degrees | Heads 832-895 in group |
| 15 | 315-337 degrees | Heads 896-959 in group |
| 16 | 337.5-359-5 degrees | Heads 960-1023 in group |

TABLE 3

32-bit Division

| Integer sent to processor | logical head location (degrees from center) | Heads in Group (32 head grouping = 1 logical head) |
|---|---|---|
| 0 | No reflection from disk | none |
| 1 | 0 through 11 degrees | Heads 0-31 in group |
| 2 | 11.25 through 22.25 degrees | Heads 32-63 in group |
| 3 | 22.5 through 33.5 degrees | Heads 64-95 in group |
| 4 | 33.75 through 44.75 degrees | Heads 96-127 in group |
| 5 | 45 through 56 degrees | Heads 128-159 in group |
| 6 | 56.25 through 67.25 degrees | Heads 160-191 in group |
| 7 | 67.5 through 78.5 degrees | Heads 192-223 in group |
| 8 | 78.75 through 89.75 degrees | Heads 224-255 in group |
| 9 | 90 through 101 degrees | Heads 256-287 in group |
| 10 | 101.25 through 112.25 degrees | Heads 288-319 in group |
| 11 | 112.5 through 123.5 degrees | Heads 320-351 in group |
| 12 | 123.75 through 134.75 degrees | Heads 352-383 in group |
| 13 | 135 through 146 degrees | Heads 384-415 in group |
| 14 | 146.25 through 157-25 degrees | Heads 416-447 in group |
| 15 | 157.5 through 168.5 degrees | Heads 448-479 in group |
| 16 | 168.75 through 179.75 degrees | Heads 480-511 in group |
| 17 | 180 through 191 degrees | Heads 512-543 in group |
| 18 | 191.25 through 202.25 degrees | Heads 544-575 in group |
| 19 | 202.5 through 213.5 degrees | Heads 576-607 in group |
| 20 | 213.75 through 224.75 degrees | Heads 608-639 in group |
| 21 | 225 through 236 degrees | Heads 640-671 in group |
| 22 | 236.25 through 247.25 degrees | Heads 672-703 in group |
| 23 | 247.5 through 258.5 degrees | Heads 704-735 in group |
| 24 | 258.75 through 269.75 degrees | Heads 736-767 in group |
| 25 | 270 through 281 degrees | Heads 768-799 in group |
| 26 | 281.25 through 292.25 degrees | Heads 800-831 in group |
| 27 | 292.5 through 303-5 degrees | Heads 832-863 in group |
| 28 | 303.75 through 314.75 degrees | Heads 864-895 in group |
| 29 | 315 through 326 degrees | Heads 896-927 in group |
| 30 | 326.25 through 337.25 degrees | Heads 928-959 in group |
| 31 | 337.5 through 348.5 degrees | Heads 960-991 in group |
| 32 | 348.75 through 359.75 degrees | Heads 992-1023 in group |

TABLE 4

64-bit Division

| Integer sent to processor | logical head location (degrees from center) | Heads in Group (16 head grouping = 1 logical head) |
|---|---|---|
| 0 | No reflection | None |
| 1 | 0 through 5.5 degrees | Heads 0-15 in group |
| 2 | 5.63 through 11.13 degrees | Heads 16-31 in group |

TABLE 4-continued

64-bit Division

| Integer sent to processor | logical head location (degrees from center) | Heads in Group (16 head grouping = 1 logical head) |
|---|---|---|
| 3 | 11.25 through 16.75 degrees | Heads 32-47 in group |
| 4 | 16.88 through 22.38 degrees | Heads 48-63 in group |
| 5 | 22.5 through 28 degrees | Heads 64-79 in group |
| 6 | 28.13 through 33.63 degrees | Heads 80-95 in group |
| 7 | 33.75 through 39.25 degrees | Heads 96-111 in group |
| 8 | 39.38 through 39.88 degrees | Heads 112-127 in group |
| 9 | 45 through 50.5 degrees | Heads 128-143 in group |
| 10 | 50.63 through 56.13 degrees | Heads 144-159 in group |
| 11 | 56.25 through 61.75 degrees | Heads 160-175 in group |
| 12 | 61.88 through 67.38 degrees | Heads 176-191 in group |
| 13 | 67.5 through 73 degrees | Heads 192-207 in group |
| 14 | 73.13 through 78.63 degrees | Heads 208-223 in group |
| 15 | 78.75 through 84.25 degrees | Heads 224-239 in group |
| 16 | 84.38 through 89.88 degrees | Heads 240-255 in group |
| 17 | 90 through 95.5 degrees | Heads 256-271 in group |
| 18 | 95.63 through 101.13 degrees | Heads 272-287 in group |
| 19 | 101.25 through 106.75 degrees | Heads 288-303 in group |
| 20 | 106.88 through 112.38 degrees | Heads 304-319 in group |
| 21 | 112.5 through 118 degrees | Heads 320-335 in group |
| 22 | 118.13 through 123.63 degrees | Heads 336-351 in group |
| 23 | 123.75 through 129.25 degrees | Heads 352-367 in group |
| 24 | 129.38 through 134.88 degrees | Heads 368-383 in group |
| 25 | 135 through 140.5 degrees | Heads 384-399 in group |
| 26 | 140.63 through 146.13 degrees | Heads 400-415 in group |
| 27 | 146.25 through 151.75 degrees | Heads 416-431 in group |
| 28 | 151.88 through 157.38 degrees | Heads 432-447 in group |
| 29 | 157.5 through 163 degrees | Heads 448-463 in group |
| 30 | 163.13 through 168.63 degrees | Heads 464-479 in group |
| 31 | 168.75 through 174.25 degrees | Heads 480-495 in group |
| 32 | 174.38 through 179.88 degrees | Heads 496-511 in group |
| 33 | 180 through 185.5 degrees | Heads 512-527 in group |
| 34 | 185.63 through 191.13 degrees | Heads 528-543 in group |
| 35 | 191.25 through 196.75 degrees | Heads 544-559 in group |
| 36 | 196.88 through 202.38 degrees | Heads 560-575 in group |
| 37 | 202.5 through 208 degrees | Heads 576-591 in group |
| 38 | 208.13 through 213.63 degrees | Heads 592-607 in group |
| 39 | 213.75 through 219.25 degrees | Heads 608-623 in group |
| 40 | 219.38 through 224.88 degrees | Heads 624-639 in group |
| 41 | 225 through 230.5 degrees | Heads 640-655 in group |
| 42 | 230.63 through 236.13 degrees | Heads 656-671 in group |
| 43 | 236.25 through 241.75 degrees | Heads 672-687 in group |
| 44 | 241.88 through 247.38 degrees | Heads 688-703 in group |
| 45 | 247.5 through 253 degrees | Heads 704-719 in group |
| 46 | 253.13 through 258.63 degrees | Heads 720-735 in group |
| 47 | 258.75 through 264.25 degrees | Heads 736-751 in group |
| 48 | 264.38 through 269.88 degrees | Heads 752-767 in group |
| 49 | 270 through 275.5 degrees | Heads 768-783 in group |
| 50 | 275.63 through 281.13 degrees | Heads 784-799 in group |
| 51 | 281.25 through 286.75 degrees | Heads 800-815 in group |
| 52 | 286.88 through 292.38 degrees | Heads 816-831 in group |
| 53 | 292.5 through 298 degrees | Heads 832-847 in group |
| 54 | 298.13 through 303.63 degrees | Heads 848-863 in group |
| 55 | 303.75 through 309.25 degrees | Heads 864-879 in group |
| 56 | 309.38 through 314.88 degrees | Heads 880-895 in group |
| 57 | 315 through 320.5 degrees | Heads 896-911 in group |
| 58 | 320.63 through 326.13 degrees | Heads 912-927 in group |
| 59 | 326.25 through 331.75 degrees | Heads 928-943 in group |
| 60 | 331.88 through 337.38 degrees | Heads 944-959 in group |
| 61 | 337.5 through 343 degrees | Heads 960-975 in group |
| 62 | 343.13 through 348.63 degrees | Heads 976-991 in group |
| 63 | 348.75 through 354.25 degrees | Heads 992-1007 in group |
| 64 | 354.38 through 359.88 degrees | Heads 1008-1023 in group |

TABLE 5

128-bit Division

| Integer sent to processor | logical head location (degrees from center) | Heads in Group (8 head grouping = 1 logical head) |
|---|---|---|
| 0 | None | None |
| 1 | 0-2.75 degrees | Heads 0-7 in group |
| 2 | 2.813-5.563 degrees | Heads 8-15 in group |
| 3 | 5.625-8.375 degrees | Heads 16-23 in group |
| 4 | 8.438-11.188 degrees | Heads 24-31 in group |
| 5 | 11.25-14 degrees | Heads 32-39 in group |
| 6 | 14.063-16.813 degrees | Heads 40-47 in group |
| 7 | 16.875-19.625 degrees | Heads 48-55 in group |
| 8 | 19.688-22.438 degrees | Heads 56-63 in group |
| 9 | 22.5-25.25 degrees | Heads 64-71 in group |
| 10 | 25.313-28.063 degrees | Heads 72-79 in group |
| 11 | 28.125-30.875 degrees | Heads 80-87 in group |
| 12 | 30.938-33.688 degrees | Heads 88-95 in group |
| 13 | 33.75-36.5 degrees | Heads 96-103 in group |
| 14 | 36.563-39.313 degrees | Heads 104-111 in group |
| 15 | 39.375-42.125 degrees | Heads 112-119 in group |
| 16 | 42.188-44.938 degrees | Heads 120-127 in group |
| 17 | 45-47.75 degrees | Heads 128-135 in group |
| 18 | 47.813-50.563 degrees | Heads 136-143 in group |
| 19 | 50.625-53.375 degrees | Heads 144-151 in group |
| 20 | 53.438-56.188 degrees | Heads 152-159 in group |
| 21 | 56.25-59 degrees | Heads 160-167 in group |
| 22 | 59.063-61.813 degrees | Heads 168-175 in group |
| 23 | 61.875-64.625 degrees | Heads 176-183 in group |
| 24 | 64.688-67.438 degrees | Heads 184-191 in group |
| 25 | 67.5-70.25 degrees | Heads 192-199 in group |
| 26 | 70.313-73.063 degrees | Heads 200-207 in group |
| 27 | 73.125-75.875 degrees | Heads 208-215 in group |
| 28 | 75.938-78.688 degrees | Heads 216-223 in group |
| 29 | 78.75-81.5 degrees | Heads 224-231 in group |
| 30 | 81.563-84.313 degrees | Heads 232-239 in group |
| 31 | 84.375-87.125 degrees | Heads 240-247 in group |
| 32 | 87.188-89.938 degrees | Heads 248-255 in group |
| 33 | 90-92.75 degrees | Heads 256-263 in group |
| 34 | 92.813-95.563 degrees | Heads 264-271 in group |
| 35 | 95.625-98.375 degrees | Heads 272-279 in group |
| 36 | 98.438-101.188 degrees | Heads 280-287 in group |
| 37 | 101.25-104 degrees | Heads 288-295 in group |
| 38 | 104.063-106.813 degrees | Heads 296-303 in group |
| 39 | 106.875-109.625 degrees | Heads 304-311 in group |
| 40 | 109.688-112.438 degrees | Heads 312-319 in group |
| 41 | 112.5-115.25 degrees | Heads 320-327 in group |
| 42 | 115.313-118.063 degrees | Heads 328-335 in group |
| 43 | 118.125-120.875 degrees | Heads 336-343 in group |
| 44 | 120.938-123.688 degrees | Heads 344-351 in group |
| 45 | 123.75-126.5 degrees | Heads 352-359 in group |
| 46 | 126.563-129.313 degrees | Heads 360-367 in group |
| 47 | 129.375-132.125 degrees | Heads 368-375 in group |
| 48 | 132.188-134.938 degrees | Heads 376-383 in group |
| 49 | 135-137.75 degrees | Heads 384-391 in group |
| 50 | 137.813-140.563 degrees | Heads 392-399 in group |
| 51 | 140.625-143.375 degrees | Heads 400-407 in group |
| 52 | 143.438-146.188 degrees | Heads 408-415 in group |
| 53 | 146.25-149 degrees | Heads 416-423 in group |
| 54 | 149.063-151.813 degrees | Heads 424-431 in group |
| 55 | 151.875-154.625 degrees | Heads 432-439 in group |
| 56 | 154.688-157.438 degrees | Heads 440-447 in group |
| 57 | 157.5-160.25 degrees | Heads 448-455 in group |
| 58 | 160.313-163.063 degrees | Heads 456-463 in group |
| 59 | 163.125-165.875 degrees | Heads 464-471 in group |
| 60 | 165.938-168.688 degrees | Heads 472-479 in group |
| 61 | 168.75-171.5 degrees | Heads 480-487 in group |
| 62 | 171.563-174.313 degrees | Heads 488-495 in group |
| 63 | 174.375-177.125 degrees | Heads 496-503 in group |
| 64 | 177.188-179.938 degrees | Heads 504-511 in group |
| 65 | 180-182.75 degrees | Heads 512-519 in group |
| 66 | 182.813-185.563 degrees | Heads 520-527 in group |
| 67 | 185.625-188.375 degrees | Heads 528-535 in group |
| 68 | 188.438-191.188 degrees | Heads 536-543 in group |
| 69 | 191.25-194 degrees | Heads 544-551 in group |
| 70 | 194.063-196.813 degrees | Heads 552-559 in group |
| 71 | 196.875-199.625 degrees | Heads 560-567 in group |
| 72 | 199.688-202.438 degrees | Heads 568-575 in group |

TABLE 5-continued

128-bit Division

| Integer sent to processor | logical head location (degrees from center) | Heads in Group (8 head grouping = 1 logical head) |
|---|---|---|
| 73 | 202.5-205.25 degrees | Heads 576-583 in group |
| 74 | 205.313-208.063 degrees | Heads 584-591 in group |
| 75 | 208.125-210.875 degrees | Heads 592-599 in group |
| 76 | 210.938-213.688 degrees | Heads 600-607 in group |
| 77 | 213.75-216.5 degrees | Heads 608-615 in group |
| 78 | 216.563-219.313 degrees | Heads 616-623 in group |
| 79 | 219.375-222.125 degrees | Heads 624-631 in group |
| 80 | 222.188-224.938 degrees | Heads 632-639 in group |
| 81 | 225-227.75 degrees | Heads 640-647 in group |
| 82 | 227.813-230.563 degrees | Heads 648-655 in group |
| 83 | 230.625-233.375 degrees | Heads 656-663 in group |
| 84 | 233.438-236.188 degrees | Heads 664-671 in group |
| 85 | 236.25-239 degrees | Heads 672-679 in group |
| 86 | 239.063-241.813 degrees | Heads 680-687 in group |
| 87 | 241.875-244.625 degrees | Heads 688-695 in group |
| 88 | 244.688-247.438 degrees | Heads 696-703 in group |
| 89 | 247.5-250.25 degrees | Heads 704-711 in group |
| 90 | 250.313-253.063 degrees | Heads 712-719 in group |
| 91 | 253.125-255.875 degrees | Heads 720-727 in group |
| 92 | 255.938-258.688 degrees | Heads 728-735 in group |
| 93 | 258.75-261.5 degrees | Heads 736-743 in group |
| 94 | 261.563-264.313 degrees | Heads 744-751 in group |
| 95 | 264.375-267.125 degrees | Heads 752-759 in group |
| 96 | 267.188-269.938 degrees | Heads 760-767 in group |
| 97 | 270-272.75 degrees | Heads 768-775 in group |
| 98 | 272.813-275.563 degrees | Heads 776-783 in group |
| 99 | 275.625-278.375 degrees | Heads 784-791 in group |
| 100 | 278.438-281.188 degrees | Heads 792-799 in group |
| 101 | 281.25-284 degrees | Heads 800-807 in group |
| 102 | 284.063-286.813 degrees | Heads 808-815 in group |
| 103 | 286.875-289.625 degrees | Heads 816-823 in group |
| 104 | 289.688-292.438 degrees | Heads 824-831 in group |
| 105 | 292.5-295.25 degrees | Heads 832-839 in group |
| 106 | 295.313-298.063 degrees | Heads 840-847 in group |
| 107 | 298.125-300.875 degrees | Heads 848-855 in group |
| 108 | 300.938-303.688 degrees | Heads 856-863 in group |
| 109 | 303.75-306.5 degrees | Heads 864-871 in group |
| 110 | 306.563-309.313 degrees | Heads 872-879 in group |
| 111 | 309.375-312.125 degrees | Heads 880-887 in group |
| 112 | 312.188-314.938 degrees | Heads 888-895 in group |
| 113 | 315-317.75 degrees | Heads 896-903 in group |
| 114 | 317.813-320.563 degrees | Heads 904-911 in group |
| 115 | 320.625-323.375 degrees | Heads 912-919 in group |
| 116 | 323.438-326.188 degrees | Heads 920-927 in group |
| 117 | 326.25-329 degrees | Heads 928-935 in group |
| 118 | 329.063-331.813 degrees | Heads 936-943 in group |
| 119 | 331.875-334.625 degrees | Heads 944-951 in group |
| 120 | 334.688-337.438 degrees | Heads 952-959 in group |
| 121 | 337.5-340.25 degrees | Heads 960-967 in group |
| 122 | 340.313-343.063 degrees | Heads 968-975 in group |
| 123 | 343.125-345.875 degrees | Heads 976-983 in group |
| 124 | 345.938-348.688 degrees | Heads 984-991 in group |
| 125 | 348.75-351.5 degrees | Heads 992-999 in group |
| 126 | 351.563-354.313 degrees | Heads 1000-1007 in group |
| 127 | 354.375-357.125 degrees | Heads 1008-1015 in group |
| 128 | 357.188-359.938 degrees | Heads 1016-1023 in group |

TABLE 6

256-bit Division

| Integer sent to processor | logical head location (degrees from center) | Heads in Group (4 head grouping = 1 logical head) |
|---|---|---|
| 0 | None | None |
| 1 | 0 through 1.38 degrees | 0 through 3 |
| 2 | 1.41 through 2.78 degrees | 4 through 7 |
| 3 | 2.82 through 4.19 degrees | 8 through 11 |
| 4 | 4.22 through 5.59 degrees | 12 through 15 |
| 5 | 5.62 through 7 degrees | 16 through 19 |
| 6 | 7.03 through 8.41 degrees | 20 through 23 |
| 7 | 8.44 through 9.81 degrees | 24 through 27 |
| 8 | 9.84 through 11.22 degrees | 28 through 31 |
| 9 | 11.25 through 12.63 degrees | 32 through 35 |
| 10 | 12.66 through 14.03 degrees | 36 through 39 |
| 11 | 14.06 through 15.44 degrees | 40 through 43 |
| 12 | 15.47 through 16.84 degrees | 44 through 47 |
| 13 | 16.87 through 18.25 degrees | 48 through 51 |
| 14 | 18.28 through 19.66 degrees | 52 through 55 |
| 15 | 19.69 through 21.06 degrees | 56 through 59 |
| 16 | 21.09 through 22.47 degrees | 60 through 63 |
| 17 | 22.50 through 23.88 degrees | 64 through 67 |
| 18 | 23.91 through 25.28 degrees | 68 through 71 |
| 19 | 25.31 through 26.69 degrees | 72 through 75 |
| 20 | 26.72 through 28.09 degrees | 76 through 79 |
| 21 | 28.12 through 29.50 degrees | 80 through 83 |
| 22 | 29.53 through 30.91 degrees | 84 through 87 |
| 23 | 30.94 through 32.31 degrees | 88 through 91 |
| 24 | 32.34 through 33.72 degrees | 92 through 95 |
| 25 | 33.75 through 35.13 degrees | 96 through 99 |
| 26 | 35.16 through 36.53 degrees | 100 through 103 |
| 27 | 36.56 through 37.94 degrees | 104 through 107 |
| 28 | 37.97 through 39.34 degrees | 108 through 113 |
| 29 | 39.37 through 40.75 degrees | 112 through 115 |
| 30 | 40.78 through 42.16 degrees | 116 through 119 |
| 31 | 42.19 through 43.56 degrees | 120 through 123 |
| 32 | 43.59 through 44.97 degrees | 124 through 127 |
| 33 | 45 through 46.38 degrees | 128 through 131 |
| 34 | 46.41 through 47.78 degrees | 132 through 135 |
| 35 | 47.81 through 49.19 degrees | 136 through 139 |
| 36 | 49.22 through 50.59 degrees | 140 through 143 |
| 37 | 50.62 through 52 degrees | 144 through 147 |
| 38 | 52.03 through 54.41 degrees | 148 through 151 |
| 39 | 53.44 through 54.81 degrees | 152 through 155 |
| 40 | 54.84 through 56.22 degrees | 156 through 159 |
| 41 | 56.25 through 57.63 degrees | 160 through 163 |
| 42 | 57.66 through 59.03 degrees | 164 through 167 |
| 43 | 59.06 through 60.44 degrees | 168 through 171 |
| 44 | 60.47 through 61.84 degrees | 172 through 175 |
| 45 | 61.87 through 63.25 degrees | 176 through 179 |
| 46 | 63.28 through 64.66 degrees | 180 through 183 |
| 47 | 64.69 through 66.06 degrees | 184 through 187 |
| 48 | 66.09 through 67.47 degrees | 188 through 191 |
| 49 | 67.5 through 68.88 degrees | 192 through 195 |
| 50 | 68.91 through 70.28 degrees | 196 through 199 |
| 51 | 70.31 through 71.69 degrees | 200 through 203 |
| 52 | 71.72 through 73.09 degrees | 204 through 207 |
| 53 | 73.12 through 74.5 degrees | 208 through 211 |
| 54 | 74.53 through 75.91 degrees | 212 through 215 |
| 55 | 75.94 through 77.31 degrees | 216 through 219 |
| 56 | 77.34 through 78.72 degrees | 220 through 223 |
| 57 | 78.75 through 80.13 degrees | 224 through 227 |
| 58 | 80.16 through 81.53 degrees | 228 through 231 |
| 59 | 81.56 through 82.94 degrees | 232 through 235 |
| 60 | 82.97 through 84.34 degrees | 236 through 239 |
| 61 | 84.37 through 85.75 degrees | 240 through 243 |
| 62 | 85.78 through 87.16 degrees | 244 through 247 |
| 63 | 87.19 through 88.56 degrees | 248 through 251 |
| 64 | 88.59 through 89.97 degrees | 252 through 255 |
| 65 | 90 through 91.38 degrees | 256 through 259 |
| 66 | 91.41 through 92.78 degrees | 260 through 263 |
| 67 | 92.81 through 94.19 degrees | 264 through 267 |
| 68 | 94.22 through 95.59 degrees | 268 through 271 |
| 69 | 95.62 through 97 degrees | 272 through 275 |
| 70 | 97.03 through 98.41 degrees | 276 through 279 |
| 71 | 98.44 through 99.81 degrees | 280 through 283 |
| 72 | 99.84 through 101.22 degrees | 284 through 287 |
| 73 | 101.25 through 102.63 degrees | 288 through 291 |
| 74 | 102.66 through 104.03 degrees | 292 through 295 |
| 75 | 104.06 through 105.44 degrees | 296 through 299 |
| 76 | 105.47 through 106.84 degrees | 300 through 303 |
| 77 | 106.87 through 108.25 degrees | 304 through 307 |

TABLE 6-continued

256-bit Division

| Integer sent to processor | logical head location (degrees from center) | Heads in Group (4 head grouping = 1 logical head) |
|---|---|---|
| 78 | 108.28 through 109.66 degrees | 308 through 311 |
| 79 | 109.69 through 111.06 degrees | 312 through 315 |
| 80 | 111.09 through 112.47 degrees | 316 through 319 |
| 81 | 112.5 through 113.88 degrees | 320 through 323 |
| 82 | 113.91 through 115.28 degrees | 324 through 327 |
| 83 | 115.31 through 116.69 degrees | 328 through 331 |
| 84 | 116.72 through 118.09 degrees | 332 through 335 |
| 85 | 118.12 through 119.5 degrees | 336 through 339 |
| 86 | 119.53 through 120.91 degrees | 340 through 343 |
| 87 | 120.94 through 122.31 degrees | 344 through 347 |
| 88 | 122.34 through 123.72 degrees | 348 through 351 |
| 89 | 123.75 through 125.13 degrees | 352 through 355 |
| 90 | 125.16 through 126.53 degrees | 356 through 359 |
| 91 | 126.56 through 127.94 degrees | 360 through 363 |
| 92 | 127.97 through 129.34 degrees | 364 through 367 |
| 93 | 129.37 through 130.75 degrees | 368 through 371 |
| 94 | 130.78 through 132.16 degrees | 372 through 375 |
| 95 | 132.19 through 133.56 degrees | 376 through 379 |
| 96 | 133.59 through 134.97 degrees | 380 through 383 |
| 97 | 135 through 136.38 degrees | 384 through 387 |
| 98 | 136.41 through 137.78 degrees | 388 through 391 |
| 99 | 137.81 through 139.19 degrees | 392 through 395 |
| 100 | 139.22 through 140.59 degrees | 396 through 399 |
| 101 | 104.62 through 142 degrees | 400 through 403 |
| 102 | 142.03 through 143.41 degrees | 404 through 407 |
| 103 | 143.44 through 144.81 degrees | 408 through 411 |
| 104 | 144.84 through 146.22 degrees | 412 through 415 |
| 105 | 146.25 through 147.63 degrees | 416 through 419 |
| 106 | 147.66 through 149.03 degrees | 420 through 423 |
| 107 | 149.06 through 150.44 degrees | 424 through 427 |
| 108 | 150.47 through 151.84 degrees | 428 through 431 |
| 109 | 151.87 through 153.25 degrees | 432 through 435 |
| 110 | 153.28 through 154.66 degrees | 436 through 439 |
| 111 | 154.69 through 156.06 degrees | 440 through 443 |
| 112 | 156.09 through 157.47 degrees | 444 through 447 |
| 113 | 157.5 through 158.88 degrees | 448 through 451 |
| 114 | 158.91 through 160.28 degrees | 452 through 455 |
| 115 | 160.31 through 161.69 degrees | 456 through 459 |
| 116 | 161.72 through 163.09 degrees | 460 through 463 |
| 117 | 163.12 through 164.5 degrees | 464 through 467 |
| 118 | 164.53 through 165.91 degrees | 468 through 471 |
| 119 | 165.94 through 167.31 degrees | 472 through 475 |
| 120 | 167.34 through 168.72 degrees | 476 through 479 |
| 121 | 168.75 through 170.13 degrees | 480 through 483 |
| 122 | 170.16 through 171.53 degrees | 484 through 487 |
| 123 | 171.56 through 172.94 degrees | 488 through 491 |
| 124 | 172.97 through 174.34 degrees | 492 through 495 |
| 125 | 174.37 through 175.75 degrees | 496 through 499 |
| 126 | 175.78 through 177.16 degrees | 500 through 503 |
| 127 | 177.19 through 178.56 degrees | 504 through 507 |
| 128 | 178.59 through 179.97 degrees | 508 through 511 |
| 129 | 180 through 181.38 degrees | 512 through 515 |
| 130 | 181.41 through 182.78 degrees | 516 through 519 |
| 131 | 182.81 through 184.19 degrees | 520 through 523 |
| 132 | 184.22 through 185.59 degrees | 524 through 527 |
| 133 | 185.62 through 187 degrees | 528 through 531 |
| 134 | 187.03 through 188.41 degrees | 532 through 535 |
| 135 | 188.44 through 189.81 degrees | 536 through 539 |
| 136 | 189.84 through 191.22 degrees | 540 through 543 |
| 137 | 191.25 through 192.63 degrees | 544 through 547 |
| 138 | 192.66 through 194.03 degrees | 548 through 551 |
| 139 | 194.06 through 195.44 degrees | 552 through 555 |
| 140 | 195.47 through 196.84 degrees | 556 through 559 |
| 141 | 196.87 through 198.25 degrees | 560 through 563 |
| 142 | 198.28 through 199.66 degrees | 564 through 567 |
| 143 | 199.69 through 201.06 degrees | 568 through 571 |
| 144 | 201.09 through 202.47 degrees | 572 through 575 |
| 145 | 202.5 through 203.88 degrees | 576 through 579 |
| 146 | 203.91 through 205.28 degrees | 580 through 583 |
| 147 | 205.31 through 206.69 degrees | 584 through 587 |
| 148 | 206.72 through 208.09 degrees | 588 through 591 |
| 149 | 208.12 through 209.5 degrees | 592 through 595 |
| 150 | 209.53 through 210.91 degrees | 596 through 599 |
| 151 | 210.94 through 212.31 degrees | 600 through 603 |
| 152 | 212.34 through 213.72 degrees | 604 through 607 |
| 153 | 213.75 through 215.13 degrees | 608 through 611 |
| 154 | 215.16 through 216.53 degrees | 612 through 615 |
| 155 | 216.56 through 217.94 degrees | 616 through 619 |
| 156 | 217.97 through 219.34 degrees | 620 through 623 |
| 157 | 219.37 through 220.75 degrees | 624 through 627 |
| 158 | 220.78 through 222.16 degrees | 628 through 631 |
| 159 | 222.19 through 223.56 degrees | 632 through 635 |
| 160 | 223.59 through 224.97 degrees | 636 through 639 |
| 161 | 225 through 226.38 degrees | 640 through 643 |
| 162 | 226.41 through 227.78 degrees | 644 through 647 |
| 163 | 227.81 through 229.19 degrees | 648 through 651 |
| 164 | 229.22 through 230.59 degrees | 652 through 655 |
| 165 | 230.62 through 232 degrees | 656 through 659 |
| 166 | 232.03 through 233.41 degrees | 660 through 663 |
| 167 | 233.44 through 234.81 degrees | 664 through 667 |
| 168 | 234.84 through 236.22 degrees | 668 through 671 |
| 169 | 236.25 through 237.63 degrees | 672 through 675 |
| 170 | 237.66 through 239.03 degrees | 676 through 679 |
| 171 | 239.06 through 240.44 degrees | 680 through 683 |
| 172 | 240.47 through 241.84 degrees | 684 through 687 |
| 173 | 241.88 through 243.25 degrees | 688 through 691 |
| 174 | 243.27 through 244.66 degrees | 692 through 695 |
| 175 | 244.69 through 246.06 degrees | 696 through 699 |
| 176 | 246.09 through 247.47 degrees | 700 through 703 |
| 177 | 247.50 through 248.88 degrees | 704 through 707 |
| 178 | 248.91 through 250.28 degrees | 708 through 711 |
| 179 | 250.31 through 251.69 degrees | 712 through 715 |
| 180 | 251.72 through 253.09 degrees | 716 through 719 |
| 181 | 253.12 through 254.5 degrees | 720 through 723 |
| 182 | 254.53 through 255.91 degrees | 724 through 727 |
| 183 | 255.94 through 257.31 degrees | 728 through 731 |
| 184 | 257.34 through 258.72 degrees | 732 through 735 |
| 185 | 258.75 through 260.13 degrees | 736 through 739 |
| 186 | 260.16 through 261.53 degrees | 740 through 743 |
| 187 | 261.56 through 262.94 degrees | 744 through 747 |
| 188 | 262.97 through 264.34 degrees | 748 through 751 |
| 189 | 264.37 through 265.75 degrees | 752 through 755 |
| 190 | 265.78 through 267.16 degrees | 756 through 759 |
| 191 | 267.19 through 268.56 degrees | 760 through 763 |
| 192 | 268.59 through 269.97 degrees | 764 through 767 |
| 193 | 270 through 271.38 degrees | 768 through 771 |
| 194 | 271.41 through 272.78 degrees | 772 through 775 |
| 195 | 272.81 through 274.19 degrees | 776 through 779 |
| 196 | 274.22 through 275.59 degrees | 780 through 783 |
| 197 | 275.62 through 277 degrees | 784 through 787 |
| 198 | 277.03 through 278.41 degrees | 788 through 791 |
| 199 | 278.44 through 279.81 degrees | 792 through 795 |
| 200 | 279.84 through 281.22 degrees | 796 through 799 |
| 201 | 281.25 through 282.63 degrees | 800 through 803 |
| 202 | 282.66 through 284.03 degrees | 804 through 807 |
| 203 | 284.06 through 285.44 degrees | 808 through 811 |
| 204 | 285.47 through 286.84 degrees | 812 through 815 |
| 205 | 286.87 through 288.25 degrees | 816 through 819 |
| 206 | 288.28 through 289.66 degrees | 820 through 823 |
| 207 | 289.69 through 291.06 degrees | 824 through 827 |
| 208 | 291.09 through 292.47 degrees | 828 through 831 |
| 209 | 292.5 through 293.88 degrees | 832 through 835 |
| 210 | 293.91 through 295.28 degrees | 836 through 839 |
| 211 | 295.31 through 296.69 degrees | 840 through 843 |
| 212 | 296.72 through 298.09 degrees | 844 through 847 |
| 213 | 298.12 through 299.5 degrees | 848 through 851 |
| 214 | 299.53 through 300.91 degrees | 852 through 855 |
| 215 | 300.94 through 302.31 degrees | 856 through 859 |
| 216 | 302.34 through 303.72 degrees | 860 through 863 |
| 217 | 303.75 through 305.13 degrees | 864 through 867 |
| 218 | 305.16 through 306.53 degrees | 868 through 871 |
| 219 | 306.56 through 307.94 degrees | 872 through 875 |
| 220 | 307.97 through 309.34 degrees | 876 through 879 |
| 221 | 309.37 through 310.75 degrees | 880 through 883 |
| 222 | 310.78 through 312.16 degrees | 884 through 887 |
| 223 | 312.19 through 313.56 degrees | 888 through 891 |

TABLE 6-continued

256-bit Division

| Integer sent to processor | logical head location (degrees from center) | Heads in Group (4 head grouping = 1 logical head) |
|---|---|---|
| 224 | 313.59 through 314.97 degrees | 892 through 895 |
| 225 | 315 through 316.38 degrees | 896 through 899 |
| 226 | 316.41 through 317.78 degrees | 900 through 903 |
| 227 | 317.81 through 319.19 degrees | 904 through 907 |
| 228 | 319.22 through 320.59 degrees | 908 through 911 |
| 229 | 320.62 through 322 degrees | 912 through 915 |
| 230 | 322.03 through 323.41 degrees | 916 through 919 |
| 231 | 323.44 through 324.81 degrees | 920 through 923 |
| 232 | 324.84 through 326.22 degrees | 924 through 927 |
| 233 | 326.25 through 327.63 degrees | 928 through 931 |
| 234 | 327.66 through 329.03 degrees | 932 through 935 |
| 235 | 329.06 through 330.44 degrees | 936 through 939 |
| 236 | 330.47 through 331.84 degrees | 940 through 943 |
| 237 | 331.87 through 333.25 degrees | 944 through 947 |
| 238 | 333.28 through 334.66 degrees | 948 through 951 |
| 239 | 334.69 through 336.06 degrees | 952 through 955 |
| 240 | 336.09 through 337.47 degrees | 956 through 959 |
| 241 | 337.5 through 338.88 degrees | 960 through 963 |
| 242 | 338.91 through 340.28 degrees | 964 through 967 |
| 243 | 340.31 through 341.69 degrees | 968 through 971 |
| 244 | 341.72 through 343.09 degrees | 972 through 975 |
| 245 | 343.12 through 344.5 degrees | 976 through 979 |
| 246 | 344.53 through 345.91 degrees | 980 through 983 |
| 247 | 345.94 through 347.31 degrees | 984 through 987 |
| 248 | 347.34 through 348.72 degrees | 988 through 991 |
| 249 | 348.75 through 350.13 degrees | 992 through 995 |
| 250 | 350.16 through 351.53 degrees | 996 through 999 |
| 251 | 351.56 through 352.94 degrees | 1000 through 1003 |
| 252 | 352.97 through 354.34 degrees | 1004 through 1007 |
| 253 | 354.37 through 355.75 degrees | 1008 through 1011 |
| 254 | 355.78 through 357.16 degrees | 1012 through 1015 |
| 255 | 357.19 through 358.56 degrees | 1016 through 1019 |
| 256 | 358.59 through 359.97 degrees | 1020 through 1023 |

TABLE 7

512-bit Division

| Integer sent to processor | logical head location (degrees from center) | Heads in Group (2 head grouping = 1 logical head) |
|---|---|---|
| 0 | None | None |
| 1 | 0 through .69 | 0 and 1 |
| 2 | 0.7 through 1.39 | 2 and 3 |
| 3 | 1.41 through 2.09 | 4 and 5 |
| 4 | 2.11 through 2.80 | 6 and 7 |
| 5 | 2.81 through 3.50 | 8 and 9 |
| 6 | 3.52 through 4.20 | 10 and 11 |
| 7 | 4.22 through 4.91 | 12 and 13 |
| 8 | 4.92 through 5.61 | 14 and 15 |
| 9 | 5.63 through 6.31 | 16 and 17 |
| 10 | 6.33 through 7.02 | 18 and 19 |
| 11 | 7.03 through 7.72 | 20 and 21 |
| 12 | 7.73 through 8.42 | 22 and 23 |
| 13 | 8.44 through 9.13 | 24 and 25 |
| 14 | 9.14 through 9.83 | 26 and 27 |
| 15 | 9.84 through 10.53 | 28 and 29 |
| 16 | 10.55 through 11.23 | 30 and 31 |
| 17 | 11.25 through 11.94 | 32 and 33 |
| 18 | 11.95 through 12.64 | 34 and 35 |
| 19 | 12.66 through 13.34 | 36 and 37 |
| 20 | 13.36 through 14.05 | 38 and 39 |
| 21 | 14.06 through 14.75 | 40 and 41 |
| 22 | 14.77 through 15.45 | 42 and 43 |
| 23 | 15.47 through 16.16 | 44 and 45 |
| 24 | 16.17 through 16.86 | 46 and 47 |
| 25 | 16.87 through 17.56 | 48 and 49 |
| 26 | 17.58 through 18.27 | 50 and 51 |
| 27 | 18.28 through 18.97 | 52 and 53 |

TABLE 7-continued

512-bit Division

| Integer sent to processor | logical head location (degrees from center) | Heads in Group (2 head grouping = 1 logical head) |
|---|---|---|
| 28 | 18.98 through 19.67 | 54 and 55 |
| 29 | 19.69 through 20.38 | 56 and 57 |
| 30 | 20.39 through 21.08 | 58 and 59 |
| 31 | 21.09 through 21.78 | 60 and 61 |
| 32 | 21.80 through 22.48 | 62 and 63 |
| 33 | 22.50 through 23.19 | 64 and 65 |
| 34 | 23.20 through 23.89 | 66 and 67 |
| 35 | 23.91 through 24.59 | 68 and 69 |
| 36 | 24.61 through 25.30 | 70 and 71 |
| 37 | 25.31 through 26 | 72 and 73 |
| 38 | 26.02 through 26.70 | 74 and 75 |
| 39 | 26.72 through 27.41 | 76 and 77 |
| 40 | 27.42 through 28.11 | 78 and 79 |
| 41 | 28.13 through 28.81 | 80 and 81 |
| 42 | 28.83 through 29.52 | 82 and 83 |
| 43 | 29.53 through 30.22 | 84 and 85 |
| 44 | 30.23 through 30.92 | 86 and 87 |
| 45 | 30.94 through 31.63 | 88 and 89 |
| 46 | 31.64 through 32.33 | 90 and 91 |
| 47 | 32.34 through 33.03 | 92 and 93 |
| 48 | 33.05 through 33.73 | 94 and 95 |
| 49 | 33.75 through 34.44 | 96 and 97 |
| 50 | 34.45 through 35.14 | 98 and 99 |
| 51 | 35.16 through 35.84 | 100 and 101 |
| 52 | 35.86 through 36.55 | 102 and 103 |
| 53 | 36.56 through 37.25 | 104 and 105 |
| 54 | 37.27 through 37.95 | 106 and 107 |
| 55 | 37.97 through 38.66 | 108 and 109 |
| 56 | 38.67 through 39.36 | 110 and 111 |
| 57 | 39.38 through 40.06 | 112 and 113 |
| 58 | 40.08 through 40.77 | 114 and 115 |
| 59 | 40.78 through 41.47 | 116 and 117 |
| 60 | 41.48 through 42.17 | 118 and 119 |
| 61 | 42.19 through 42.88 | 120 and 121 |
| 62 | 42.89 through 43.58 | 122 and 123 |
| 63 | 43.59 through 44.28 | 124 and 125 |
| 64 | 44.30 through 44.98 | 126 and 127 |
| 65 | 45 through 45.69 | 128 and 129 |
| 66 | 45.70 through –46.39 | 130 and 131 |
| 67 | 46.41 through 47.09 | 132 and 133 |
| 68 | 47.11 through 47.80 | 134 and 135 |
| 69 | 47.81 through 48.5 | 136 and 137 |
| 70 | 48.52 through 49.20 | 138 and 139 |
| 71 | 49.22 through 49.91 | 140 and 141 |
| 72 | 49.92 through 50.61 | 142 and 143 |
| 73 | 50.63 through 51.31 | 144 and 145 |
| 74 | 51.33 through 52.02 | 146 and 147 |
| 75 | 52.03 through 52.72 | 148 and 149 |
| 76 | 52.73 through 53.42 | 150 and 151 |
| 77 | 53.44 through 54.13 | 152 and 153 |
| 78 | 54.14 through 54.83 | 154 and 155 |
| 79 | 54.84 through 55.53 | 156 and 157 |
| 80 | 55.55 through 56.23 | 158 and 159 |
| 81 | 56.25 through 56.94 | 160 and 161 |
| 82 | 56.95 through 57.64 | 162 and 163 |
| 83 | 57.66 through 58.34 | 164 and 165 |
| 84 | 58.36 through 59.05 | 166 and 167 |
| 85 | 59.06 through 59.75 | 168 and 169 |
| 86 | 59.77 through 60.45 | 170 and 171 |
| 87 | 60.47 through 61.16 | 172 and 173 |
| 88 | 61.17 through 61.86 | 174 and 175 |
| 89 | 61.88 through 62.56 | 176 and 177 |
| 90 | 62.58 through 63.27 | 178 and 179 |
| 91 | 63.28 through 63.97 | 180 and 181 |
| 92 | 63.98 through 64.67 | 182 and 183 |
| 93 | 64.69 through 65.38 | 184 and 185 |
| 94 | 65.39 through 66.08 | 186 and 187 |
| 95 | 66.09 through 66.78 | 188 and 189 |
| 96 | 66.80 through 67.48 | 190 and 191 |
| 97 | 67.50 through 68.19 | 192 and 193 |
| 98 | 68.20 through 68.89 | 194 and 195 |
| 99 | 68.91 through 69.59 | 196 and 197 |
| 100 | 69.61 through 70.30 | 198 and 199 |

TABLE 7-continued

512-bit Division

| Integer sent to processor | logical head location (degrees from center) | Heads in Group (2 head grouping = 1 logical head) |
|---|---|---|
| 101 | 70.31 through 71 | 200 and 201 |
| 102 | 71.02 through 71.70 | 202 and 203 |
| 103 | 71.72 through 72.41 | 204 and 205 |
| 104 | 72.42 through 73.11 | 206 and 207 |
| 105 | 73.13 through 73.81 | 208 and 209 |
| 106 | 73.83 through 74.51 | 210 and 211 |
| 107 | 74.53 through 75.22 | 212 and 213 |
| 108 | 75.23 through 75.92 | 214 and 215 |
| 109 | 75.94 through 76.63 | 216 and 217 |
| 110 | 76.64 through 77.33 | 218 and 219 |
| 111 | 77.34 through 78.03 | 220 and 221 |
| 112 | 78.05 through 78.73 | 222 and 223 |
| 113 | 78.75 through 79.44 | 224 and 225 |
| 114 | 79.45 through 80.14 | 226 and 227 |
| 115 | 80.16 through 80.84 | 228 and 229 |
| 116 | 80.86 through 81.55 | 230 and 231 |
| 117 | 81.56 through 82.25 | 232 and 233 |
| 118 | 82.27 through 82.95 | 234 and 235 |
| 119 | 82.97 through 83.66 | 236 and 237 |
| 120 | 83.67 through 84.36 | 238 and 239 |
| 121 | 84.38 through 85.06 | 240 and 241 |
| 122 | 85.08 through 85.77 | 242 and 243 |
| 123 | 85.78 through 86.46 | 244 and 245 |
| 124 | 86.48 through 87.17 | 246 and 247 |
| 125 | 87.19 through 87.88 | 248 and 249 |
| 126 | 87.89 through 88.58 | 250 and 251 |
| 127 | 88.59 through 89.28 | 252 and 253 |
| 128 | 89.30 through 89.98 | 254 and 255 |
| 129 | 90 through 90.69 | 256 and 257 |
| 130 | 90.70 through 91.39 | 258 and 259 |
| 131 | 91.41 through 92.09 | 260 and 261 |
| 132 | 92.11 through 92.80 | 262 and 263 |
| 133 | 92.81 through 93.5 | 264 and 265 |
| 134 | 93.52 through 94.20 | 266 and 267 |
| 135 | 94.22 through 94.91 | 268 and 269 |
| 136 | 94.92 through 95.61 | 270 and 271 |
| 137 | 95.63 through 96.31 | 272 and 273 |
| 138 | 96.33 through 97.02 | 274 and 275 |
| 139 | 97.03 through 97.72 | 276 and 277 |
| 140 | 97.73 through 98.42 | 278 and 279 |
| 141 | 98.44 through 99.13 | 280 and 281 |
| 142 | 99.14 through 99.83 | 282 and 283 |
| 143 | 99.84 through 100.53 | 284 and 285 |
| 144 | 100.55 through 101.23 | 286 and 287 |
| 145 | 101.25 through 101.94 | 288 and 289 |
| 146 | 101.95 through 102.64 | 290 and 291 |
| 147 | 102.66 through 103.34 | 292 and 293 |
| 148 | 103.36 through 104.05 | 294 and 295 |
| 149 | 104.06 through 104.75 | 296 and 297 |
| 150 | 104.77 through 105.45 | 298 and 299 |
| 151 | 105.47 through 106.16 | 300 and 301 |
| 152 | 106.17 through 106.86 | 302 and 303 |
| 153 | 106.88 through 107.56 | 304 and 305 |
| 154 | 107.58 through 108.27 | 306 and 307 |
| 155 | 108.28 through 108.97 | 308 and 309 |
| 156 | 108.98 through 109.67 | 310 and 311 |
| 157 | 109.69 through 110.38 | 312 and 313 |
| 158 | 110.39 through 111.08 | 314 and 315 |
| 159 | 111.09 through 111.78 | 316 and 317 |
| 160 | 111.80 through 112.48 | 318 and 319 |
| 161 | 112.5 through 113.19 | 320 and 321 |
| 162 | 113.20 through 113.89 | 322 and 323 |
| 163 | 113.91 through 114.59 | 324 and 325 |
| 164 | 114.61 through 115.30 | 326 and 327 |
| 165 | 115.31 through 116 | 328 and 329 |
| 166 | 116.01 through 116.70 | 330 and 331 |
| 167 | 116.72 through 117.41 | 332 and 333 |
| 168 | 117.42 through 118.11 | 334 and 335 |
| 169 | 118.13 through 118.81 | 336 and 337 |
| 170 | 118.83 through 119.52 | 338 and 339 |
| 171 | 119.53 through 120.22 | 340 and 341 |
| 172 | 120.23 through 120.92 | 342 and 343 |
| 173 | 120.94 through 121.63 | 344 and 345 |
| 174 | 121.64 through 122.33 | 346 and 347 |
| 175 | 122.34 through 123.03 | 348 and 349 |
| 176 | 123.05 through 123.73 | 350 and 351 |
| 177 | 123.75 through 124.44 | 352 and 353 |
| 178 | 124.45 through 125.14 | 354 and 355 |
| 179 | 125.16 through 125.84 | 356 and 357 |
| 180 | 125.86 through 126.54 | 358 and 359 |
| 181 | 126.56 through 127.25 | 360 and 361 |
| 182 | 127.27 through 127.95 | 362 and 363 |
| 183 | 127.97 through 128.66 | 364 and 365 |
| 184 | 128.67 through 129.36 | 366 and 367 |
| 185 | 129.38 through 130.06 | 368 and 369 |
| 186 | 130.08 through 130.77 | 370 and 371 |
| 187 | 130.78 through 131.47 | 372 and 373 |
| 188 | 131.48 through 132.17 | 374 and 375 |
| 189 | 132.19 through 132.88 | 376 and 377 |
| 190 | 132.89 through 133.58 | 378 and 379 |
| 191 | 133.59 through 134.28 | 380 and 381 |
| 192 | 134.30 through 134.98 | 382 and 383 |
| 193 | 135 through 135.69 | 384 and 385 |
| 194 | 135.70 through 136.39 | 386 and 387 |
| 195 | 136.41 through 137.09 | 388 and 389 |
| 196 | 137.11 through 137.80 | 390 and 391 |
| 197 | 137.81 through 138.5 | 392 and 393 |
| 198 | 138.52 through 139.20 | 394 and 395 |
| 199 | 139.22 through 139.91 | 396 and 397 |
| 200 | 139.92 through 140.61 | 398 and 399 |
| 201 | 140.63 through 141.31 | 400 and 401 |
| 202 | 141.33 through 142.02 | 402 and 403 |
| 203 | 142.03 through 142.72 | 404 and 405 |
| 204 | 142.73 through 143.42 | 406 and 407 |
| 205 | 143.44 through 144.13 | 408 and 409 |
| 206 | 144.14 through 144.83 | 410 and 411 |
| 207 | 144.84 through 145.53 | 412 and 413 |
| 208 | 145.55 through 146.23 | 414 and 415 |
| 209 | 146.25 through 146.94 | 416 and 417 |
| 210 | 146.95 through 147.64 | 418 and 419 |
| 211 | 147.66 through 148.34 | 420 and 421 |
| 212 | 148.36 through 149.05 | 422 and 423 |
| 213 | 149.06 through 149.75 | 424 and 425 |
| 214 | 149.77 through 150.45 | 426 and 427 |
| 215 | 150.47 through 151.16 | 428 and 429 |
| 216 | 151.17 through 151.86 | 430 and 431 |
| 217 | 151.88 through 152.56 | 432 and 433 |
| 218 | 152.58 through 153.27 | 434 and 435 |
| 219 | 153.28 through 153.97 | 436 and 437 |
| 220 | 153.98 through 154.67 | 438 and 439 |
| 221 | 154.69 through 155.38 | 440 and 441 |
| 222 | 155.39 through 156.08 | 442 and 443 |
| 223 | 156.09 through 156.78 | 444 and 445 |
| 224 | 156.80 through 157.48 | 446 and 447 |
| 225 | 157.50 through 158.19 | 448 and 449 |
| 226 | 158.20 through 158.89 | 450 and 451 |
| 227 | 158.91 through 159.59 | 452 and 453 |
| 228 | 159.61 through 160.30 | 454 and 455 |
| 229 | 160.31 through 161 | 456 and 457 |
| 230 | 161.02 through 161.70 | 458 and 459 |
| 231 | 161.72 through 162.41 | 460 and 461 |
| 232 | 162.42 through 163.11 | 462 and 463 |
| 233 | 163.13 through 163.81 | 464 and 465 |
| 234 | 163.83 through 164.52 | 466 and 467 |
| 235 | 164.53 through 165.22 | 468 and 469 |
| 236 | 165.23 through 165.92 | 470 and 471 |
| 237 | 165.94 through 166.63 | 472 and 473 |
| 238 | 166.64 through 167.33 | 474 and 475 |
| 239 | 167.34 through 168.03 | 476 and 477 |
| 240 | 168.05 through 168.73 | 478 and 479 |
| 241 | 168.75 through 169.44 | 480 and 481 |
| 242 | 169.45 through 170.14 | 482 and 483 |
| 243 | 170.16 through 170.84 | 484 and 485 |
| 244 | 170.86 through 171.55 | 486 and 487 |
| 245 | 171.56 through 172.25 | 488 and 489 |
| 246 | 172.27 through 172.95 | 490 and 491 |

TABLE 7-continued

512-bit Division

| Integer sent to processor | logical head location (degrees from center) | Heads in Group (2 head grouping = 1 logical head) |
|---|---|---|
| 247 | 172.97 through 173.66 | 492 and 493 |
| 248 | 173.67 through 174.36 | 494 and 495 |
| 249 | 174.38 through 175.06 | 496 and 497 |
| 250 | 175.08 through 175.77 | 498 and 499 |
| 251 | 175.78 through 176.47 | 500 and 501 |
| 252 | 176.48 through 177.17 | 502 and 503 |
| 253 | 177.19 through 177.88 | 504 and 505 |
| 254 | 177.89 through 178.58 | 506 and 507 |
| 255 | 178.59 through 179.28 | 508 and 509 |
| 256 | 179.30 through 179.98 | 510 and 511 |
| 257 | 180 through 180.69 | 512 and 513 |
| 258 | 180.70 through 181.39 | 514 and 515 |
| 259 | 181.41 through 182.09 | 516 and 517 |
| 260 | 182.11 through 182.80 | 518 and 519 |
| 261 | 182.81 through 183.5 | 520 and 521 |
| 262 | 183.52 through 184.20 | 522 and 523 |
| 263 | 184.22 through 184.91 | 524 and 525 |
| 264 | 184.92 through 185.61 | 526 and 527 |
| 265 | 185.63 through 186.31 | 528 and 529 |
| 266 | 186.33 through 187.02 | 530 and 531 |
| 267 | 187.03 through 187.72 | 532 and 533 |
| 268 | 187.73 through 188.42 | 534 and 535 |
| 269 | 188.44 through 189.13 | 536 and 537 |
| 270 | 189.14 through 189.83 | 538 and 539 |
| 271 | 189.84 through 190.53 | 540 and 541 |
| 272 | 190.55 through 191.23 | 542 and 543 |
| 273 | 191.25 through 191.94 | 544 and 545 |
| 274 | 191.95 through 192.64 | 546 and 547 |
| 275 | 192.66 through 193.34 | 548 and 549 |
| 276 | 193.36 through 194.05 | 550 and 551 |
| 277 | 194.06 through 194.75 | 552 and 553 |
| 278 | 194.77 through 195.45 | 554 and 555 |
| 279 | 195.47 through 196.16 | 556 and 557 |
| 280 | 196.17 through 196.86 | 558 and 559 |
| 281 | 196.88 through 197.56 | 560 and 561 |
| 282 | 197.58 through 198.27 | 562 and 563 |
| 283 | 198.28 through 198.97 | 564 and 565 |
| 284 | 198.98 through 199.67 | 566 and 567 |
| 285 | 199.69 through 200.38 | 568 and 569 |
| 286 | 200.39 through 201.08 | 570 and 571 |
| 287 | 201.09 through 201.78 | 572 and 573 |
| 288 | 201.80 through 202.48 | 574 and 575 |
| 289 | 202.5 through 203.19 | 576 and 577 |
| 290 | 203.20 through 203.89 | 578 and 579 |
| 291 | 203.91 through 204.59 | 580 and 581 |
| 292 | 204.61 through 205.30 | 582 and 583 |
| 293 | 205.31 through 206 | 584 and 585 |
| 294 | 206.01 through 206.70 | 586 and 587 |
| 295 | 206.72 through 207.41 | 588 and 589 |
| 296 | 207.42 through 208.11 | 590 and 591 |
| 297 | 208.13 through 208.81 | 592 and 593 |
| 298 | 208.83 through 209.51 | 594 and 595 |
| 299 | 209.53 through 210.22 | 596 and 597 |
| 300 | 210.23 through 210.92 | 598 and 599 |
| 301 | 210.94 through 211.63 | 600 and 601 |
| 302 | 211.64 through 212.33 | 602 and 603 |
| 303 | 212.34 through 213.03 | 604 and 605 |
| 304 | 213.05 through 213.73 | 606 and 607 |
| 305 | 213.75 through 214.44 | 608 and 609 |
| 306 | 214.45 through 215.14 | 610 and 611 |
| 307 | 215.16 through 215.84 | 612 and 613 |
| 308 | 215.86 through 216.55 | 614 and 615 |
| 309 | 216.56 through 217.25 | 616 and 617 |
| 310 | 217.27 through 217.95 | 618 and 619 |
| 311 | 217.97 through 218.66 | 620 and 621 |
| 312 | 218.67 through 219.36 | 622 and 623 |
| 313 | 219.38 through 220.06 | 624 and 625 |
| 314 | 220.08 through 220.77 | 626 and 627 |
| 315 | 220.78 through 221.47 | 628 and 629 |
| 316 | 221.48 through 222.17 | 630 and 631 |
| 317 | 222.19 through 222.88 | 632 and 633 |
| 318 | 222.89 through 223.58 | 634 and 635 |
| 319 | 223.59 through 224.28 | 636 and 637 |
| 320 | 224.30 through 224.98 | 638 and 639 |
| 321 | 225 through 225.69 | 640 and 641 |
| 322 | 225.70 through 226.39 | 642 and 643 |
| 323 | 226.41 through 227.09 | 644 and 645 |
| 324 | 227.11 through 227.80 | 646 and 647 |
| 325 | 227.81 through 228.5 | 648 and 649 |
| 326 | 228.52 through 229.20 | 650 and 651 |
| 327 | 229.22 through 229.91 | 652 and 653 |
| 328 | 229.92 through 230.61 | 654 and 655 |
| 329 | 230.63 through 231.31 | 656 and 657 |
| 330 | 231.33 through 232.02 | 658 and 659 |
| 331 | 232.03 through 232.72 | 660 and 661 |
| 332 | 232.73 through 233.42 | 662 and 663 |
| 333 | 233.44 through 234.13 | 664 and 665 |
| 334 | 234.14 through 234.83 | 666 and 667 |
| 335 | 234.84 through 235.53 | 668 and 669 |
| 336 | 235.55 through 236.23 | 670 and 671 |
| 337 | 236.25 through 236.94 | 672 and 673 |
| 338 | 236.95 through 237.64 | 674 and 675 |
| 339 | 237.66 through 238.34 | 676 and 677 |
| 340 | 238.36 through 239.05 | 678 and 679 |
| 341 | 239.06 through 239.75 | 680 and 681 |
| 342 | 239.77 through 240.45 | 682 and 683 |
| 343 | 240.47 through 241.16 | 684 and 685 |
| 344 | 241.17 through 241.86 | 686 and 687 |
| 345 | 241.88-242.56 | 688 and 689 |
| 346 | 242.58 through 243.27 | 690 and 691 |
| 347 | 243.28 through 243.97 | 692 and 693 |
| 348 | 243.98 through 244.67 | 694 and 695 |
| 349 | 244.69 through 245.38 | 696 and 697 |
| 350 | 245.39 through 246.08 | 698 and 699 |
| 351 | 246.09 through 246.78 | 700 and 701 |
| 352 | 246.80 through 247.48 | 702 and 703 |
| 353 | 247.50 through 248.19 | 704 and 705 |
| 354 | 248.20 through 248.89 | 706 and 707 |
| 355 | 248.91 through 249.59 | 708 and 709 |
| 356 | 249.61 through 250.30 | 710 and 711 |
| 357 | 250.31 through 251 | 712 and 713 |
| 358 | 251.02 through 251.70 | 714 and 715 |
| 359 | 251.72 through 252.41 | 716 and 717 |
| 360 | 252.42 through 253.11 | 718 and 719 |
| 361 | 253.13 through 253.81 | 720 and 721 |
| 362 | 253.83 through 254.52 | 722 and 723 |
| 363 | 254.53 through 255.22 | 724 and 725 |
| 364 | 255.23 through 255.92 | 726 and 727 |
| 365 | 255.94 through 256.63 | 728 and 729 |
| 366 | 256.64 through 257.33 | 730 and 731 |
| 367 | 257.34 through 258.03 | 732 and 733 |
| 368 | 258.05 through 258.73 | 734 and 735 |
| 369 | 258.75 through 259.44 | 736 and 737 |
| 370 | 259.45 through 260.14 | 738 and 739 |
| 371 | 260.16 through 260.84 | 740 and 741 |
| 372 | 260.86 through 261.55 | 742 and 743 |
| 373 | 261.56 through 262.25 | 744 and 745 |
| 374 | 262.27 through 262.95 | 746 and 747 |
| 375 | 262.97 through 263.66 | 748 and 749 |
| 376 | 263.67 through 264.36 | 750 and 751 |
| 377 | 264.38 through 265.06 | 752 and 753 |
| 378 | 265.08 through 265.77 | 754 and 755 |
| 379 | 265.78 through 266.47 | 756 and 757 |
| 380 | 266.48 through 267.17 | 758 and 759 |
| 381 | 267.19 through 267.88 | 760 and 761 |
| 382 | 267.89 through 268.58 | 762 and 763 |
| 383 | 268.59 through 269.28 | 764 and 765 |
| 384 | 269.30 through 269.98 | 766 and 767 |
| 385 | 270 through 270.69 | 768 and 769 |
| 386 | 270.70 through 271.39 | 770 and 771 |
| 387 | 271.41 through 272.09 | 772 and 773 |
| 388 | 272.11 through 272.80 | 774 and 775 |
| 389 | 272.81 through 273.5 | 776 and 777 |
| 390 | 273.52 through 274.20 | 778 and 779 |
| 391 | 274.22 through 274.91 | 780 and 781 |
| 392 | 274.92 through 275.61 | 782 and 783 |

TABLE 7-continued

512-bit Division

| Integer sent to processor | logical head location (degrees from center) | Heads in Group (2 head grouping = 1 logical head) |
|---|---|---|
| 393 | 275.63 through 276.31 | 784 and 785 |
| 394 | 276.33 through 277.02 | 786 and 787 |
| 395 | 277.03 through 277.72 | 788 and 789 |
| 396 | 277.73 through 278.42 | 790 and 791 |
| 397 | 278.44 through 279.13 | 792 and 793 |
| 398 | 279.14 through 279.83 | 794 and 795 |
| 399 | 279.84 through 280.53 | 796 and 797 |
| 400 | 280.55 through 281.23 | 798 and 799 |
| 401 | 281.25 through 281.94 | 800 and 801 |
| 402 | 281.95 through 282.64 | 802 and 803 |
| 403 | 282.66 through 283.34 | 804 and 805 |
| 404 | 283.36 through 284.05 | 806 and 807 |
| 405 | 284.06 through 284.75 | 808 and 809 |
| 406 | 284.77 through 285.45 | 810 and 811 |
| 407 | 285.47 through 286.16 | 812 and 813 |
| 408 | 286.17 through 286.86 | 814 and 815 |
| 409 | 286.88 through 287.56 | 816 and 817 |
| 410 | 287.58 through 288.27 | 818 and 819 |
| 411 | 288.28 through 288.97 | 820 and 821 |
| 412 | 288.98 through 289.67 | 822 and 823 |
| 413 | 289.69 through 290.38 | 824 and 825 |
| 414 | 290.39 through 291.08 | 826 and 827 |
| 415 | 291.09 through 291.78 | 828 and 829 |
| 416 | 291.80 through 292.48 | 830 and 831 |
| 417 | 292.5 through 293.19 | 832 and 833 |
| 418 | 293.20 through 293.89 | 834 and 835 |
| 419 | 293.91 through 294.59 | 836 and 837 |
| 420 | 294.61 through 295.30 | 838 and 839 |
| 421 | 295.31 through 296 | 840 and 841 |
| 422 | 296.01 through 296.70 | 842 and 843 |
| 423 | 296.72 through 297.41 | 844 and 845 |
| 424 | 297.42 through 298.11 | 846 and 847 |
| 425 | 298.13 through 298.81 | 848 and 849 |
| 426 | 298.83 through 299.52 | 850 and 851 |
| 427 | 299.53 through 300.22 | 852 and 853 |
| 428 | 300.23 through 300.92 | 854 and 855 |
| 429 | 300.94 through 301.63 | 856 and 857 |
| 430 | 301.64 through 302.33 | 858 and 859 |
| 431 | 302.34 through 303.03 | 860 and 861 |
| 432 | 303.05 through 303.73 | 862 and 863 |
| 433 | 303.75 through 304.44 | 864 and 865 |
| 434 | 304.45 through 305.14 | 866 and 867 |
| 435 | 305.16 through 305.84 | 868 and 869 |
| 436 | 305.86 through 306.55 | 870 and 871 |
| 437 | 306.56 through 307.25 | 872 and 873 |
| 438 | 307.27 through 307.95 | 874 and 875 |
| 439 | 307.97 through 308.66 | 876 and 877 |
| 440 | 308.67 through 309.36 | 878 and 879 |
| 441 | 309.38 through 310.06 | 880 and 881 |
| 442 | 310.08 through 310.77 | 882 and 883 |
| 443 | 310.78 through 311.47 | 884 and 885 |
| 444 | 311.48 through 312.17 | 886 and 887 |
| 445 | 312.19 through 312.88 | 888 and 889 |
| 446 | 312.89 through 313.58 | 890 and 891 |
| 447 | 313.59 through 314.28 | 892 and 893 |
| 448 | 314.30 through 314.98 | 894 and 895 |
| 449 | 315 through 315.69 | 896 and 897 |
| 450 | 315.70 through 316.39 | 898 and 899 |
| 451 | 316.41 through 317.09 | 900 and 901 |
| 452 | 317.11 through 317.80 | 902 and 903 |
| 453 | 317.81 through 318.5 | 904 and 905 |
| 454 | 318.52 through 319.20 | 906 and 907 |
| 455 | 319.22 through 319.91 | 908 and 909 |
| 456 | 319.92 through 320.61 | 910 and 911 |
| 457 | 320.63 through 321.31 | 912 and 913 |
| 458 | 321.33 through 322.02 | 914 and 915 |
| 459 | 322.03 through 322.72 | 916 and 917 |
| 460 | 322.73 through 323.42 | 918 and 919 |
| 461 | 323.44 through 324.13 | 920 and 921 |
| 462 | 324.14 through 324.83 | 922 and 923 |
| 463 | 324.84 through 325.53 | 924 and 925 |
| 464 | 325.55 through 326.23 | 926 and 927 |
| 465 | 326.25 through 326.94 | 928 and 929 |
| 466 | 326.95 through 327.64 | 930 and 931 |
| 467 | 327.66 through 328.34 | 932 and 933 |
| 468 | 328.36 through 329.05 | 934 and 935 |
| 469 | 329.06 through 329.75 | 936 and 937 |
| 470 | 329.77 through 330.45 | 938 and 939 |
| 471 | 330.47 through 331.16 | 940 and 941 |
| 472 | 331.17 through 331.86 | 942 and 943 |
| 473 | 331.88 through 332.56 | 944 and 945 |
| 474 | 332.58 through 333.27 | 946 and 947 |
| 475 | 333.28 through 333.97 | 948 and 949 |
| 476 | 333.98 through 334.67 | 950 and 951 |
| 477 | 334.69 through 335.38 | 952 and 953 |
| 478 | 335.39 through 336.08 | 954 and 955 |
| 479 | 336.09 through 336.78 | 956 and 957 |
| 480 | 336.80 through 337.48 | 958 and 959 |
| 481 | 337.5 through 338.19 | 960 and 961 |
| 482 | 338.20 through 338.89 | 962 and 963 |
| 483 | 338.91 through 339.59 | 964 and 965 |
| 484 | 339.61 through 340.30 | 966 and 967 |
| 485 | 340.31 through 341 | 968 and 969 |
| 486 | 341.02 through 341.70 | 970 and 971 |
| 487 | 341.72 through 342.41 | 972 and 973 |
| 488 | 342.42 through 343.11 | 974 and 975 |
| 489 | 343.13 through 343.81 | 976 and 977 |
| 490 | 343.83 through 344.52 | 978 and 979 |
| 491 | 344.53 through 345.22 | 980 and 981 |
| 492 | 345.23 through 345.92 | 982 and 983 |
| 493 | 345.94 through 346.63 | 984 and 985 |
| 494 | 346.64 through 347.33 | 986 and 987 |
| 495 | 347.34 through 348.03 | 988 and 989 |
| 496 | 348.05 through 348.73 | 990 and 991 |
| 497 | 348.75 through 349.44 | 992 and 993 |
| 498 | 349.45 through 350.14 | 994 and 995 |
| 499 | 350.16 through 350.84 | 996 and 997 |
| 500 | 350.86 through 351.55 | 998 and 999 |
| 501 | 351.56 through 352.25 | 1000 and 1001 |
| 502 | 352.27 through 352.95 | 1002 and 1003 |
| 503 | 352.97 through 353.66 | 1004 and 1005 |
| 504 | 353.67 through 354.36 | 1006 and 1007 |
| 505 | 354.38 through 355.06 | 1008 and 1009 |
| 506 | 355.08 through 355.77 | 1010 and 1011 |
| 507 | 355.78 through 356.47 | 1012 and 1013 |
| 508 | 356.48 through 357.17 | 1014 and 1015 |
| 509 | 357.19 through 357.88 | 1016 and 1017 |
| 510 | 357.89 through 358.58 | 1018 and 1019 |
| 511 | 358.59 through 359.28 | 1020 and 1021 |
| 512 | 359.30 through 359.98 | 1022 and 1023 |

TABLE 8

1024-bit (1k) Division

| Integer sent to processor | logical head location (degrees from center) | Head (one to one physical to logical correlation) |
|---|---|---|
| 0 | None | None |
| 1 | 0-.344 | 0 |
| 2 | .351-.695 | 1 |
| 3 | .703-1.047 | 2 |
| 4 | 1.055-1.398 | 3 |
| 5 | 1.406-1.750 | 4 |
| 6 | 1.758-2.102 | 5 |
| 7 | 2.109-2.453 | 6 |
| 8 | 2.461-2.805 | 7 |
| 9 | 2.813-3.156 | 8 |
| 10 | 3.164-3.508 | 9 |
| 11 | 3.516-3.859 | 10 |
| 12 | 3.867-4.211 | 11 |
| 13 | 4.219-4.563 | 12 |
| 14 | 4.570-4.914 | 13 |

TABLE 8-continued 1024-bit (1k) Division

| Integer sent to processor | logical head location (degrees from center) | Head (one to one physical to logical correlation) |
|---|---|---|
| 15 | 4.922-5.266 | 14 |
| 16 | 5.273-5.617 | 15 |
| 17 | 5.625-5.969 | 16 |
| 18 | 5.976-6.320 | 17 |
| 19 | 6.328-6.672 | 18 |
| 20 | 6.680-7.023 | 19 |
| 21 | 7.031-7.375 | 20 |
| 22 | 7.383-7.727 | 21 |
| 23 | 7.734-8.078 | 22 |
| 24 | 8.086-8.430 | 23 |
| 25 | 8.437-8.781 | 24 |
| 26 | 8.789-9.133 | 25 |
| 27 | 9.141-9.484 | 26 |
| 28 | 9.492-9.836 | 27 |
| 29 | 9.844-10.188 | 28 |
| 30 | 10.195-10.539 | 29 |
| 31 | 10.547-10.891 | 30 |
| 32 | 10.898-11.242 | 31 |
| 33 | 11.25-11.594 | 32 |
| 34 | 11.602-11.945 | 33 |
| 35 | 11.953-12.297 | 34 |
| 36 | 12.305-12.648 | 35 |
| 37 | 12.656-13 | 36 |
| 38 | 13.008-13.352 | 37 |
| 39 | 13.359-13.703 | 38 |
| 40 | 13.711-14.055 | 39 |
| 41 | 14.063-14.406 | 40 |
| 42 | 14.414-14.758 | 41 |
| 43 | 14.766-15.109 | 42 |
| 44 | 15.117-15.461 | 43 |
| 45 | 15.469-15.813 | 44 |
| 46 | 15.820-16.164 | 45 |
| 47 | 16.172-16.516 | 46 |
| 48 | 16.523-16.867 | 47 |
| 49 | 16.875-17.219 | 48 |
| 50 | 17.227-17.570 | 49 |
| 51 | 17.578-17.922 | 50 |
| 52 | 17.930-18.273 | 51 |
| 53 | 18.281-18.625 | 52 |
| 54 | 18.633-18.977 | 53 |
| 55 | 18.984-19.328 | 54 |
| 56 | 19.336-19.680 | 55 |
| 57 | 19.688-20.031 | 56 |
| 58 | 20.039-20.383 | 57 |
| 59 | 20.391-20.734 | 58 |
| 60 | 20.742-21.086 | 59 |
| 61 | 21.093-21.438 | 60 |
| 62 | 21.445-21.789 | 61 |
| 63 | 21.797-22.141 | 62 |
| 64 | 22.148-22.492 | 63 |
| 65 | 22.5-22.844 | 64 |
| 66 | 22.852-23.195 | 65 |
| 67 | 23.203-23.547 | 66 |
| 68 | 23.555-23.898 | 67 |
| 69 | 23.906-24.25 | 68 |
| 70 | 24.258-24.602 | 69 |
| 71 | 24.609-24.953 | 70 |
| 72 | 24.961-25.305 | 71 |
| 73 | 25.313-25.656 | 72 |
| 74 | 25.664-26.008 | 73 |
| 75 | 26.016-26.359 | 74 |
| 76 | 26.367-26.711 | 75 |
| 77 | 26.719-27.063 | 76 |
| 78 | 27.070-27.414 | 77 |
| 79 | 27.422-27.766 | 78 |
| 80 | 27.773-28.117 | 79 |
| 81 | 28.125-28.469 | 80 |
| 82 | 28.477-28.820 | 81 |
| 83 | 28.828-29.172 | 82 |
| 84 | 29.180-29.523 | 83 |
| 85 | 29.531-29.875 | 84 |
| 86 | 29.883-30.227 | 85 |
| 87 | 30.234-30.578 | 86 |
| 88 | 30.586-30.930 | 87 |
| 89 | 30.938-31.281 | 88 |
| 90 | 31.289-31.633 | 89 |
| 91 | 31.641-31.984 | 90 |
| 92 | 31.992-32.336 | 91 |
| 93 | 32.344-32.688 | 92 |
| 94 | 32.695-33.039 | 93 |
| 95 | 33.047-33.391 | 94 |
| 96 | 33.398-33.742 | 95 |
| 97 | 33.75-34.094 | 96 |
| 98 | 34.102-34.445 | 97 |
| 99 | 34.453-34.797 | 98 |
| 100 | 34.805-35.148 | 99 |
| 101 | 35.156-35.5 | 100 |
| 102 | 35.508-35.852 | 101 |
| 103 | 35.859-36.203 | 102 |
| 104 | 36.211-36.555 | 103 |
| 105 | 36.563-36.906 | 104 |
| 106 | 36.914-37.258 | 105 |
| 107 | 37.266-37.609 | 106 |
| 108 | 37.617-37.961 | 107 |
| 109 | 37.969-38.313 | 108 |
| 110 | 38.320-38.664 | 109 |
| 111 | 38.672-39.016 | 110 |
| 112 | 39.023-39.367 | 111 |
| 113 | 39.375-39.719 | 112 |
| 114 | 39.727-40.070 | 113 |
| 115 | 40.078-40.422 | 114 |
| 116 | 40.430-40.773 | 115 |
| 117 | 40.781-41.125 | 116 |
| 118 | 41.133-41.477 | 117 |
| 119 | 41.484-41.828 | 118 |
| 120 | 41.836-42.180 | 119 |
| 121 | 42.188-42.531 | 120 |
| 122 | 42.539-42.883 | 121 |
| 123 | 42.891-43.234 | 122 |
| 124 | 43.242-43.586 | 123 |
| 125 | 43.594-43.938 | 124 |
| 126 | 43.945-44.289 | 125 |
| 127 | 44.297-44.641 | 126 |
| 128 | 44.648-44.992 | 127 |
| 129 | 45-45.344 | 128 |
| 130 | 45.352-45.695 | 129 |
| 131 | 45.703-46.047 | 130 |
| 132 | 46.055-46.398 | 131 |
| 133 | 46.406-46.75 | 132 |
| 134 | 46.758-47.102 | 133 |
| 135 | 47.109-47.453 | 134 |
| 136 | 47.461-47.805 | 135 |
| 137 | 47.813-48.156 | 136 |
| 138 | 48.164-48.508 | 137 |
| 139 | 48.516-48.859 | 138 |
| 140 | 48.867-49.211 | 139 |
| 141 | 49.219-49.563 | 140 |
| 142 | 49.570-49.914 | 141 |
| 143 | 49.922-50.266 | 142 |
| 144 | 50.273-50.617 | 143 |
| 145 | 50.625-50.969 | 144 |
| 146 | 50.977-51.320 | 145 |
| 147 | 51.328-51.672 | 146 |
| 148 | 51.80-52.023 | 147 |
| 149 | 52.031-52.375 | 148 |
| 150 | 52.383-52.727 | 149 |
| 151 | 52.734-53.078 | 150 |
| 152 | 53.086-53.430 | 151 |
| 153 | 53.438-53.781 | 152 |
| 154 | 53.789-54.133 | 153 |
| 155 | 54.141-54.484 | 154 |
| 156 | 54.492-54.836 | 155 |
| 157 | 54.844-55.188 | 156 |
| 158 | 55.195-55.539 | 157 |
| 159 | 55.547-55.891 | 158 |
| 160 | 55.898-56.242 | 159 |
| 161 | 56.25-56.594 | 160 |
| 162 | 56.602-56.945 | 161 |

TABLE 8-continued

1024-bit (1k) Division

| Integer sent to processor | logical head location (degrees from center) | Head (one to one physical to logical correlation) |
|---|---|---|
| 163 | 56.953-57.297 | 162 |
| 164 | 57.305-57.648 | 163 |
| 165 | 57.656-58 | 164 |
| 166 | 58.008-58.352 | 165 |
| 167 | 58.359-58.703 | 166 |
| 168 | 58.711-59.055 | 167 |
| 169 | 59.063-59.406 | 168 |
| 170 | 59.414-59.758 | 169 |
| 171 | 59.766-60.109 | 170 |
| 172 | 60.117-60.461 | 171 |
| 173 | 60.469-60.813 | 172 |
| 174 | 60.820-61.164 | 173 |
| 175 | 61.172-61.516 | 174 |
| 176 | 61.523-61.867 | 175 |
| 177 | 61.875-62.219 | 176 |
| 178 | 62.227-62.570 | 177 |
| 179 | 62.578-62.922 | 178 |
| 180 | 62.930-63.273 | 179 |
| 181 | 63.281-63.625 | 180 |
| 182 | 63.633-63.977 | 181 |
| 183 | 63.984-64.328 | 182 |
| 184 | 64.336-64.680 | 183 |
| 185 | 64.688-65.031 | 184 |
| 186 | 65.039-65.383 | 185 |
| 187 | 65.391-65.734 | 186 |
| 188 | 65.742-66.086 | 187 |
| 189 | 66.094-66.438 | 188 |
| 190 | 66.445-66.789 | 189 |
| 191 | 66.979-67.141 | 190 |
| 192 | 67.148-67.492 | 191 |
| 193 | 67.5-67.844 | 192 |
| 194 | 67.852-68.195 | 193 |
| 195 | 68.203-68.547 | 194 |
| 196 | 68.555-68.898 | 195 |
| 197 | 68.906-69.25 | 196 |
| 198 | 69.258-69.602 | 197 |
| 199 | 69.609-69.953 | 198 |
| 200 | 69.961-70.305 | 199 |
| 201 | 70.313-70.656 | 200 |
| 202 | 70.664-71.008 | 201 |
| 203 | 71.016-71.359 | 202 |
| 204 | 71.367-71.711 | 203 |
| 205 | 71.719-72.063 | 204 |
| 206 | 72.070-72.414 | 205 |
| 207 | 72.422-72.766 | 206 |
| 208 | 72.773-73.117 | 207 |
| 209 | 73.125-73.469 | 208 |
| 210 | 73.477-73.820 | 209 |
| 211 | 73.828-74.172 | 210 |
| 212 | 74.180-74.523 | 211 |
| 213 | 74.532-74.875 | 212 |
| 214 | 74.883-75.226 | 213 |
| 215 | 75.234-75.578 | 214 |
| 216 | 75.586-75.930 | 215 |
| 217 | 75.938-76.281 | 216 |
| 218 | 76.289-76.633 | 217 |
| 219 | 76.641-76.984 | 218 |
| 220 | 76.992-77.336 | 219 |
| 221 | 77.344-77.688 | 220 |
| 222 | 77.695-78.039 | 221 |
| 223 | 78.047-78.391 | 222 |
| 224 | 78.398-78.742 | 223 |
| 225 | 78.75-79.094 | 224 |
| 226 | 79.102-79.445 | 225 |
| 227 | 79.453-79.797 | 226 |
| 228 | 79.805-80.148 | 227 |
| 229 | 80.156-80.5 | 228 |
| 230 | 80.508-80.852 | 229 |
| 231 | 80.859-81.203 | 230 |
| 232 | 81.211-81.555 | 231 |
| 233 | 81.563-81.906 | 232 |
| 234 | 81.914-82.258 | 233 |
| 235 | 82.266-82.609 | 234 |
| 236 | 82.617-82.961 | 235 |
| 237 | 82.969-83.313 | 236 |
| 238 | 83.320-83.664 | 237 |
| 239 | 83.672-84.016 | 238 |
| 240 | 84.023-84.367 | 239 |
| 241 | 84.375-84.719 | 240 |
| 242 | 84.727-85.070 | 241 |
| 243 | 85.078-85.422 | 242 |
| 244 | 85.430-85.773 | 243 |
| 245 | 85.781-86.125 | 244 |
| 246 | 86.133-86.477 | 245 |
| 247 | 86.484-86.828 | 246 |
| 248 | 86.836-87.180 | 247 |
| 249 | 87.188-87.531 | 248 |
| 250 | 87.539-87.883 | 249 |
| 251 | 87.891-88.234 | 250 |
| 252 | 88.242-88.586 | 251 |
| 253 | 88.594-88.938 | 252 |
| 254 | 88.945-89.289 | 253 |
| 255 | 89.297-89.641 | 254 |
| 256 | 89.648-89.992 | 255 |
| 257 | 90-90.344 | 256 |
| 258 | 90.352-90.695 | 257 |
| 259 | 90.703-91.047 | 258 |
| 260 | 91.055-91.398 | 259 |
| 261 | 91.406-91.75 | 260 |
| 262 | 91.758-92.102 | 261 |
| 263 | 92.109-92.453 | 262 |
| 264 | 92.461-92.805 | 263 |
| 265 | 92.813-93.156 | 264 |
| 266 | 93.164-93.508 | 265 |
| 267 | 93.516-93.859 | 266 |
| 268 | 93.867-94.211 | 267 |
| 269 | 94.219-94.563 | 268 |
| 270 | 94.570-94.914 | 269 |
| 271 | 94.922-95.266 | 270 |
| 272 | 95.273-95.617 | 271 |
| 273 | 95.625-95.969 | 272 |
| 274 | 95.977-96.320 | 273 |
| 275 | 96.328-96.672 | 274 |
| 276 | 96.680-97.023 | 275 |
| 277 | 97.031-97.375 | 276 |
| 278 | 97.383-97.727 | 277 |
| 279 | 97.734-98.078 | 278 |
| 280 | 98.086-98.430 | 279 |
| 281 | 98.438-98.781 | 280 |
| 282 | 98.789-99.133 | 281 |
| 283 | 99.141-99.484 | 282 |
| 284 | 99.492-99.836 | 283 |
| 285 | 99.844-100.188 | 284 |
| 286 | 100.195-100.539 | 285 |
| 287 | 100.547-100.891 | 286 |
| 288 | 100.898-101.242 | 287 |
| 289 | 101.25-101.594 | 288 |
| 290 | 101.602-101.945 | 289 |
| 291 | 101.953-102.297 | 290 |
| 292 | 102.305-102.648 | 291 |
| 293 | 102.656-103 | 292 |
| 294 | 103.008-103.352 | 293 |
| 295 | 103.359-103.703 | 294 |
| 296 | 103.711-104.055 | 295 |
| 297 | 104.063-104.406 | 296 |
| 298 | 104.414-104.758 | 297 |
| 299 | 104.766-105.109 | 298 |
| 300 | 105.117-105.461 | 299 |
| 301 | 105.469-105.812 | 300 |
| 302 | 105.820-106.164 | 301 |
| 303 | 106.172-106.516 | 302 |
| 304 | 106.523-106.867 | 303 |
| 305 | 106.875-107.219 | 304 |
| 306 | 107.227-107.570 | 305 |
| 307 | 107.578-107.922 | 306 |
| 308 | 107.930-108.273 | 307 |
| 309 | 108.281-108.625 | 308 |
| 310 | 108.633-108.977 | 309 |

TABLE 8-continued

1024-bit (1k) Division

| Integer sent to processor | logical head location (degrees from center) | Head (one to one physical to logical correlation) |
|---|---|---|
| 311 | 108.984-109.328 | 310 |
| 312 | 109.336-109.680 | 311 |
| 313 | 109.688-110.031 | 312 |
| 314 | 110.039-110.383 | 313 |
| 315 | 110.391-110.734 | 314 |
| 316 | 110.742-111.086 | 315 |
| 317 | 111.094-111.438 | 316 |
| 318 | 111.445-111.789 | 317 |
| 319 | 111.797-112.141 | 318 |
| 320 | 112.148-112.492 | 319 |
| 321 | 112.5-112.844 | 320 |
| 322 | 112.852-113.195 | 321 |
| 323 | 113.203-113.547 | 322 |
| 324 | 113.555-113.898 | 323 |
| 325 | 113.906-114.25 | 324 |
| 326 | 114.258-114.602 | 325 |
| 327 | 114.609-114.953 | 326 |
| 328 | 114.961-115.305 | 327 |
| 329 | 115.313-115.656 | 328 |
| 330 | 115.664-116.008 | 329 |
| 331 | 116.016-116.359 | 330 |
| 332 | 116.367-116.711 | 331 |
| 333 | 116.719-117.063 | 332 |
| 334 | 117.070-117.414 | 333 |
| 335 | 117.422-117.766 | 334 |
| 336 | 117.773-118.117 | 335 |
| 337 | 118.125-118.469 | 336 |
| 338 | 118.477-118.820 | 337 |
| 339 | 118.828-119.172 | 338 |
| 340 | 119.180-119.523 | 339 |
| 341 | 119.531-119.875 | 340 |
| 342 | 119.883-120.227 | 341 |
| 343 | 120.234-120.578 | 342 |
| 344 | 120.586-120.930 | 343 |
| 345 | 120.938-121.281 | 344 |
| 346 | 121.289-121.633 | 345 |
| 347 | 121.641-121.984 | 346 |
| 348 | 121.992-122.336 | 347 |
| 349 | 122.344-122.688 | 348 |
| 350 | 122.695-123.039 | 349 |
| 351 | 123.047-123.391 | 350 |
| 352 | 123.398-123.742 | 351 |
| 353 | 123.75-124.094 | 352 |
| 354 | 124.102-124.445 | 353 |
| 355 | 124.453-124.797 | 354 |
| 356 | 124.805-125.148 | 355 |
| 357 | 125.156-125.5 | 356 |
| 358 | 125.508-125.852 | 357 |
| 359 | 125.859-126.203 | 358 |
| 360 | 126.211-126.555 | 359 |
| 361 | 126.563-126.906 | 360 |
| 362 | 126.914-127.258 | 361 |
| 363 | 127.266-127.609 | 362 |
| 364 | 127.617-127.961 | 363 |
| 365 | 127.969-128.313 | 364 |
| 366 | 128.320-128.664 | 365 |
| 367 | 128.672-129.016 | 366 |
| 368 | 129.023-129.367 | 367 |
| 369 | 129.375-129.719 | 368 |
| 370 | 129.727-130.070 | 369 |
| 371 | 130.078-130.422 | 370 |
| 372 | 130.430-130.773 | 371 |
| 373 | 130.781-131.125 | 372 |
| 374 | 131.133-131.477 | 373 |
| 375 | 131.484-131.828 | 374 |
| 376 | 131.836-132.180 | 375 |
| 377 | 132.188-132.531 | 376 |
| 378 | 132.539-132.883 | 377 |
| 379 | 132.891-133.234 | 378 |
| 380 | 133.242-133.586 | 379 |
| 381 | 133.594-133.938 | 380 |
| 382 | 133.945-134.289 | 381 |
| 383 | 134.297-134.641 | 382 |
| 384 | 134.648-134.992 | 383 |
| 385 | 135-135.344 | 384 |
| 386 | 135.352-135.695 | 385 |
| 387 | 135.703-136.047 | 386 |
| 388 | 136.055-136.398 | 387 |
| 389 | 136.406-136.75 | 388 |
| 390 | 136.758-137.102 | 389 |
| 391 | 137.109-137.453 | 390 |
| 392 | 137.461-137.805 | 391 |
| 393 | 137.813-138.157 | 392 |
| 394 | 138.164-138.508 | 393 |
| 395 | 138.516-138.859 | 394 |
| 396 | 138.867-139.211 | 395 |
| 397 | 139.219-139.563 | 396 |
| 398 | 139.570-139.914 | 397 |
| 399 | 139.922-140.266 | 398 |
| 400 | 140.273-140.617 | 399 |
| 401 | 140.625-140.969 | 400 |
| 402 | 140.977-141.320 | 401 |
| 403 | 141.328-141.672 | 402 |
| 404 | 141.680-142.023 | 403 |
| 405 | 142.031-142.375 | 404 |
| 406 | 142.383-142.727 | 405 |
| 407 | 142.734-143.078 | 406 |
| 408 | 143.086-143.430 | 407 |
| 409 | 143.438-143.781 | 408 |
| 410 | 143.789-144.133 | 409 |
| 411 | 144.141-144.484 | 410 |
| 412 | 144.492-144.836 | 411 |
| 413 | 144.844-145.188 | 412 |
| 414 | 145.195-145.539 | 413 |
| 415 | 145.547-145.891 | 414 |
| 416 | 145.898-146.242 | 415 |
| 417 | 146.25-146.594 | 416 |
| 418 | 146.602-146.945 | 417 |
| 419 | 146.953-147.297 | 418 |
| 420 | 147.305-147.648 | 419 |
| 421 | 147.656-148 | 420 |
| 422 | 148.008-148.352 | 421 |
| 423 | 148.359-148.703 | 422 |
| 424 | 148.711-149.055 | 423 |
| 425 | 149.063-149.406 | 424 |
| 426 | 149.414-149.758 | 425 |
| 427 | 149.766-150.109 | 426 |
| 428 | 150.117-150.461 | 427 |
| 429 | 150.469-150.813 | 428 |
| 430 | 150.820-151.164 | 429 |
| 431 | 151.172-151.516 | 430 |
| 432 | 151.523-151.867 | 431 |
| 433 | 151.875-152.219 | 432 |
| 434 | 152.227-152.570 | 433 |
| 435 | 152.578-152.922 | 434 |
| 436 | 152.930-153.273 | 435 |
| 437 | 153.281-153.625 | 436 |
| 438 | 153.633-153.977 | 437 |
| 439 | 153.984-154.328 | 438 |
| 440 | 154.336-154.680 | 439 |
| 441 | 154.688-155.031 | 440 |
| 442 | 155.039-155.383 | 441 |
| 443 | 155.391-155.734 | 442 |
| 444 | 155.742-156.086 | 443 |
| 445 | 156.094-156.438 | 444 |
| 446 | 156.445-156.789 | 445 |
| 447 | 156.797-157.141 | 446 |
| 448 | 157.148-157.492 | 447 |
| 449 | 157.5-157.844 | 448 |
| 450 | 157.852-158.195 | 449 |
| 451 | 158.203-158.547 | 450 |
| 452 | 158.555-158.898 | 451 |
| 453 | 158.906-159.25 | 452 |
| 454 | 159.258-159.602 | 453 |
| 455 | 159.609-159.953 | 454 |
| 456 | 159.961-160.305 | 455 |
| 457 | 160.313-160.656 | 456 |
| 458 | 160.664-161.008 | 457 |

TABLE 8-continued 1024-bit (1k) Division

| Integer sent to processor | logical head location (degrees from center) | Head (one to one physical to logical correlation) |
|---|---|---|
| 459 | 161.016-161.359 | 458 |
| 460 | 161.367-161.711 | 459 |
| 461 | 161.719-162.063 | 460 |
| 462 | 162.070-162.414 | 461 |
| 463 | 162.422-162.766 | 462 |
| 464 | 162.773-163.117 | 463 |
| 465 | 163.125-163.469 | 464 |
| 466 | 163.477-163.820 | 465 |
| 467 | 163.828-164.172 | 466 |
| 468 | 164.180-164.523 | 467 |
| 469 | 164.531-164.875 | 468 |
| 470 | 164.883-165.227 | 469 |
| 471 | 165.234-165.578 | 470 |
| 472 | 165.586-165.930 | 471 |
| 473 | 165.938-166.281 | 472 |
| 474 | 166.289-166.633 | 473 |
| 475 | 166.641-166.984 | 474 |
| 476 | 166.992-167.336 | 475 |
| 477 | 167.344-167.688 | 476 |
| 478 | 167.695-168.039 | 477 |
| 479 | 168.047-168.391 | 478 |
| 480 | 168.398-168.742 | 479 |
| 481 | 168.75-169.094 | 480 |
| 482 | 169.102-169.445 | 481 |
| 483 | 169.453-169.797 | 482 |
| 484 | 169.805-170.148 | 483 |
| 485 | 170.156-170.5 | 484 |
| 486 | 170.508-170.852 | 485 |
| 487 | 170.859-171.203 | 486 |
| 488 | 171.211-171.555 | 487 |
| 489 | 171.563-171.906 | 488 |
| 490 | 171.914-172.258 | 489 |
| 491 | 172.266-172.609 | 490 |
| 492 | 172.617-172.961 | 491 |
| 493 | 172.969-173.313 | 492 |
| 494 | 173.320-173.664 | 493 |
| 495 | 173.672-174.016 | 494 |
| 496 | 174.023-174.367 | 495 |
| 497 | 174.375-174.719 | 496 |
| 498 | 174.727-175.070 | 497 |
| 499 | 175.078-075.422 | 498 |
| 500 | 175.430-175.773 | 499 |
| 501 | 175.781-176.125 | 500 |
| 502 | 176.133-176.477 | 501 |
| 503 | 176.484-176.828 | 502 |
| 504 | 176.836-177.180 | 503 |
| 505 | 177.188-177.531 | 504 |
| 506 | 177.539-177.883 | 505 |
| 507 | 177.891-178.234 | 506 |
| 508 | 178.242-178.586 | 507 |
| 509 | 178.594-178.938 | 508 |
| 510 | 178.945-179.289 | 509 |
| 511 | 179.297-179.641 | 510 |
| 512 | 179.648-179.992 | 511 |
| 513 | 180-180.344 | 512 |
| 514 | 180.352-180.695 | 513 |
| 515 | 180.703-181.047 | 514 |
| 516 | 181.055-181.398 | 515 |
| 517 | 181.406-181.75 | 516 |
| 518 | 181.758-182.102 | 517 |
| 519 | 182.109-182.453 | 518 |
| 520 | 182.461-182.805 | 519 |
| 521 | 182.813-183.156 | 520 |
| 522 | 183.164-183.508 | 521 |
| 523 | 183.516-183.859 | 522 |
| 524 | 183.867-184.211 | 523 |
| 525 | 184.219-184.562 | 524 |
| 526 | 184.570-184.914 | 525 |
| 527 | 184.922-185.266 | 526 |
| 528 | 185.273-185.617 | 527 |
| 529 | 185.625-185.969 | 528 |
| 530 | 185.977-186.320 | 529 |
| 531 | 186.328-186.672 | 530 |
| 532 | 186.680-187.023 | 531 |
| 533 | 187.031-187.375 | 532 |
| 534 | 187.383-187.727 | 533 |
| 535 | 187.734-188.078 | 534 |
| 536 | 188.086-188.430 | 535 |
| 537 | 188.438-188.781 | 536 |
| 538 | 188.789-189.133 | 537 |
| 539 | 189.141-189.484 | 538 |
| 540 | 189.492-189.836 | 539 |
| 541 | 189.844-190.188 | 540 |
| 542 | 190.195-190.539 | 541 |
| 543 | 190.547-190.891 | 542 |
| 544 | 190.898-191.242 | 543 |
| 545 | 191.25-191.594 | 544 |
| 546 | 191.602-191.945 | 545 |
| 547 | 191.953-192.297 | 546 |
| 548 | 192.305-192.648 | 547 |
| 549 | 192.656-193 | 548 |
| 550 | 193.008-193.352 | 549 |
| 551 | 193.359-193.703 | 550 |
| 552 | 193.711-194.055 | 551 |
| 553 | 194.063-194.406 | 552 |
| 554 | 194.414-194.758 | 553 |
| 555 | 194.766-195.109 | 554 |
| 556 | 195.117-195.461 | 555 |
| 557 | 195.469-195.813 | 556 |
| 558 | 195.820-196.164 | 557 |
| 559 | 196.172-196.516 | 558 |
| 560 | 196.523-196.867 | 559 |
| 561 | 196.875-197.219 | 560 |
| 562 | 197.227-197.570 | 561 |
| 563 | 197.578-197.922 | 562 |
| 564 | 197.930-198.273 | 563 |
| 565 | 198.281-198.625 | 564 |
| 566 | 198.632-198.977 | 565 |
| 567 | 198.984-199.328 | 566 |
| 568 | 199.336-199.680 | 567 |
| 569 | 199.688-200.031 | 568 |
| 570 | 200.039-200.383 | 569 |
| 571 | 200.391-200.734 | 570 |
| 572 | 200.742-201.086 | 571 |
| 573 | 201.094-201.438 | 572 |
| 574 | 201.445-201.789 | 573 |
| 575 | 201.797-202.141 | 574 |
| 576 | 202.148-202.492 | 575 |
| 577 | 202.5-202.844 | 576 |
| 578 | 202.852-203.195 | 577 |
| 579 | 203.203-203.547 | 578 |
| 580 | 203.555-203.898 | 579 |
| 581 | 203.906-204.25 | 580 |
| 582 | 204.258-204.602 | 581 |
| 583 | 204.609-204.953 | 582 |
| 584 | 204.961-205.305 | 583 |
| 585 | 205.313-205.656 | 584 |
| 586 | 205.664-206.008 | 585 |
| 587 | 206.016-206.359 | 586 |
| 588 | 206.367-206.711 | 587 |
| 589 | 206.719-207.063 | 588 |
| 590 | 207.070-207.414 | 589 |
| 591 | 207.422-207.766 | 590 |
| 592 | 207.773-208.117 | 591 |
| 593 | 208.125-208.469 | 592 |
| 594 | 208.477-208.820 | 593 |
| 595 | 208.828-209.172 | 594 |
| 596 | 209.180-209.523 | 595 |
| 597 | 209.531-209.875 | 596 |
| 598 | 209.883-210.227 | 597 |
| 599 | 210.234-210.578 | 598 |
| 600 | 210.586-210.930 | 599 |
| 601 | 210.938-211.281 | 600 |
| 602 | 211.289-211.633 | 601 |
| 603 | 211.641-211.984 | 602 |
| 604 | 211.992-212.336 | 603 |
| 605 | 212.344-212.688 | 604 |
| 606 | 212.698-213.039 | 605 |

TABLE 8-continued 1024-bit (1k) Division

| Integer sent to processor | logical head location (degrees from center) | Head (one to one physical to logical correlation) |
|---|---|---|
| 607 | 213.047-213.391 | 606 |
| 608 | 213.398-213.742 | 607 |
| 609 | 213.75-214.094 | 608 |
| 610 | 214.102-214.445 | 609 |
| 611 | 214.453-214.797 | 610 |
| 612 | 214.805-215.148 | 611 |
| 613 | 215.156-215.5 | 612 |
| 614 | 215.508-215.852 | 613 |
| 615 | 215.859-216.203 | 614 |
| 616 | 216.211-216.555 | 615 |
| 617 | 216.563-216.906 | 616 |
| 618 | 216.914-217.258 | 617 |
| 619 | 217.266-217.609 | 618 |
| 620 | 217.617-217.961 | 619 |
| 621 | 217.969-218.313 | 620 |
| 622 | 218.320-218.664 | 621 |
| 623 | 218.672-219.016 | 622 |
| 624 | 219.023-219.367 | 623 |
| 625 | 219.375-219.719 | 624 |
| 626 | 219.727-220.070 | 625 |
| 627 | 220.078-220.422 | 626 |
| 628 | 220.430-220.773 | 627 |
| 629 | 220.781-221.125 | 628 |
| 630 | 221.133-221.477 | 629 |
| 631 | 221.484-221.828 | 630 |
| 632 | 221.836-222.180 | 631 |
| 633 | 222.188-222.531 | 632 |
| 634 | 222.539-222.883 | 633 |
| 635 | 222.891-223.234 | 634 |
| 636 | 223.242-223.586 | 635 |
| 637 | 223.594-223.938 | 636 |
| 638 | 223.945-224.289 | 637 |
| 639 | 224.297-224.641 | 638 |
| 640 | 224.648-224.992 | 639 |
| 641 | 225-225.344 | 640 |
| 642 | 225.352-225.695 | 641 |
| 643 | 225.703-226.047 | 642 |
| 644 | 226.055-226.398 | 643 |
| 645 | 226.406-226.75 | 644 |
| 646 | 226.758-227.102 | 645 |
| 647 | 227.109-227.453 | 646 |
| 648 | 227.461-227.805 | 647 |
| 649 | 227.813-228.156 | 648 |
| 650 | 228.164-228.508 | 649 |
| 651 | 228.516-228.859 | 650 |
| 652 | 228.867-229.211 | 651 |
| 653 | 229.219-229.563 | 652 |
| 654 | 229.570-229.914 | 653 |
| 655 | 229.922-230.266 | 654 |
| 656 | 230.273-230.617 | 655 |
| 657 | 230.625-230.969 | 656 |
| 658 | 230.977-231.320 | 657 |
| 659 | 231.328-231.672 | 658 |
| 660 | 231.680-232.023 | 659 |
| 661 | 232.031-232.375 | 660 |
| 662 | 232.383-232.727 | 661 |
| 663 | 232.734-233.078 | 662 |
| 664 | 233.086-233.430 | 663 |
| 665 | 233.438-233.781 | 664 |
| 666 | 233.789-234.133 | 665 |
| 667 | 234.141-234.484 | 666 |
| 668 | 234.492-234.836 | 667 |
| 669 | 234.844-235.188 | 668 |
| 670 | 235.195-235.539 | 669 |
| 671 | 235.547-235.891 | 670 |
| 672 | 235.898-236.242 | 671 |
| 673 | 236.25-236.594 | 672 |
| 674 | 236.602-236.945 | 673 |
| 675 | 236.953-237.297 | 674 |
| 676 | 237.305-237.648 | 675 |
| 677 | 237.656-238 | 676 |
| 678 | 238.008-238.352 | 677 |
| 679 | 238.359-238.703 | 678 |
| 680 | 238.711-239.055 | 679 |
| 681 | 239.063-239.406 | 680 |
| 682 | 239.414-239.758 | 681 |
| 683 | 239.766-240.109 | 682 |
| 684 | 240.117-240.461 | 683 |
| 685 | 240.469-240.813 | 684 |
| 686 | 240.820-241.164 | 685 |
| 687 | 241.172-241.516 | 686 |
| 688 | 241.523-241.867 | 687 |
| 689 | 241.875-242.219 | 688 |
| 690 | 242.227-242.570 | 689 |
| 691 | 242.578-242.922 | 690 |
| 692 | 242.930-243.273 | 691 |
| 693 | 243.281-243.625 | 692 |
| 694 | 243.633-243.977 | 693 |
| 695 | 243.984-244.328 | 694 |
| 696 | 244.336-244.680 | 695 |
| 697 | 244.688-245.031 | 696 |
| 698 | 245.039-245.383 | 697 |
| 699 | 245.391-245.734 | 698 |
| 700 | 245.742-246.086 | 699 |
| 701 | 246.094-246.438 | 700 |
| 702 | 246.445-246.789 | 701 |
| 703 | 246.797-247.141 | 702 |
| 704 | 247.148-247.492 | 703 |
| 705 | 247.5-247.844 | 704 |
| 706 | 247.852-248.195 | 705 |
| 707 | 248.203-248.547 | 706 |
| 708 | 248.555-248.898 | 707 |
| 709 | 248.906-249.25 | 708 |
| 710 | 249.258-249.602 | 709 |
| 711 | 249.609-249.953 | 710 |
| 712 | 249.961-250.305 | 711 |
| 713 | 250.313-250.656 | 712 |
| 714 | 250.664-251.008 | 713 |
| 715 | 251.016-251.359 | 714 |
| 716 | 251.367-251.711 | 715 |
| 717 | 251.719-252.063 | 716 |
| 718 | 252.070-252.414 | 717 |
| 719 | 252.422-252.766 | 718 |
| 720 | 252.773-253.117 | 719 |
| 721 | 253.125-253.469 | 720 |
| 722 | 253.477-253.820 | 721 |
| 723 | 253.828-254.172 | 722 |
| 724 | 254.180-254.523 | 723 |
| 725 | 254.531-254.875 | 724 |
| 726 | 254.883-255.227 | 725 |
| 727 | 255.234-255.578 | 726 |
| 728 | 255.586-255.930 | 727 |
| 729 | 255.938-256.281 | 728 |
| 730 | 256.289-256.633 | 729 |
| 731 | 256.641-256.984 | 730 |
| 732 | 256.992-257.336 | 731 |
| 733 | 257.344-257.688 | 732 |
| 734 | 257.695-258.039 | 733 |
| 735 | 258.047-258.391 | 734 |
| 736 | 258.398-258.742 | 735 |
| 737 | 258.75-259.094 | 736 |
| 738 | 259.102-259.445 | 737 |
| 739 | 259.453-259.797 | 738 |
| 740 | 259.805-260.148 | 739 |
| 741 | 260.156-260.5 | 740 |
| 742 | 260.508-260.852 | 741 |
| 743 | 260.859-261.203 | 742 |
| 744 | 261.211-261.555 | 743 |
| 745 | 261.563-261.906 | 744 |
| 746 | 261.914-262.258 | 745 |
| 747 | 262.266-262.609 | 746 |
| 748 | 262.617-262.961 | 747 |
| 749 | 262.969-263.313 | 748 |
| 750 | 263.320-263.664 | 749 |
| 751 | 263.672-264.016 | 750 |
| 752 | 264.023-264.367 | 751 |
| 753 | 264.375-264.719 | 752 |
| 754 | 264.727-265.070 | 753 |

TABLE 8-continued

1024-bit (1k) Division

| Integer sent to processor | logical head location (degrees from center) | Head (one to one physical to logical correlation) |
|---|---|---|
| 755 | 265.078-265.422 | 754 |
| 756 | 265.430-265.773 | 755 |
| 757 | 265.781-266.125 | 756 |
| 758 | 266.133-266.477 | 757 |
| 759 | 266.484-266.828 | 758 |
| 760 | 266.836-267.180 | 759 |
| 761 | 267.188-267.531 | 760 |
| 762 | 267.539-267.883 | 761 |
| 763 | 267.891-268.234 | 762 |
| 764 | 268.242-268.586 | 763 |
| 765 | 268.594-268.938 | 764 |
| 766 | 268.945-269.289 | 765 |
| 767 | 269.297-269.641 | 766 |
| 768 | 269.648-269.992 | 767 |
| 769 | 270-270.344 | 768 |
| 770 | 270.352-270.695 | 769 |
| 771 | 270.703-271.047 | 770 |
| 772 | 271.055-271.398 | 771 |
| 773 | 271.406-271.75 | 772 |
| 774 | 271.758-272.102 | 773 |
| 775 | 272.109-272.453 | 774 |
| 776 | 272.461-272.805 | 775 |
| 777 | 272.813-273.156 | 776 |
| 778 | 273.164-273.508 | 777 |
| 779 | 273.516-273.859 | 778 |
| 780 | 273.867-274.211 | 779 |
| 781 | 274.219-274.563 | 780 |
| 782 | 274.570-274.914 | 781 |
| 783 | 274.922-275.266 | 782 |
| 784 | 275.273-275.617 | 783 |
| 785 | 275.625-275.969 | 784 |
| 786 | 275.977-276.320 | 785 |
| 787 | 276.328-276.672 | 786 |
| 788 | 276.680-277.023 | 787 |
| 789 | 277.031-277.375 | 788 |
| 790 | 277.383-277.727 | 789 |
| 791 | 277.734-278.078 | 790 |
| 792 | 278.086-278.430 | 791 |
| 793 | 278.438-278.781 | 792 |
| 794 | 278.789-279.133 | 793 |
| 795 | 279.141-279.484 | 794 |
| 796 | 279.492-279.836 | 795 |
| 797 | 279.844-280.188 | 796 |
| 798 | 280.195-280.539 | 797 |
| 799 | 280.547-280.891 | 798 |
| 800 | 280.898-281.242 | 799 |
| 801 | 281.25-281.594 | 800 |
| 802 | 281.602-281.945 | 801 |
| 803 | 281.953-282.297 | 802 |
| 814 | 282.305-282.648 | 803 |
| 805 | 282.656-283 | 814 |
| 806 | 283.008-283.352 | 805 |
| 807 | 283.359-283.703 | 806 |
| 808 | 283.711-284.055 | 807 |
| 809 | 284.063-284.406 | 808 |
| 810 | 284.414-284.758 | 809 |
| 811 | 284.766-285.109 | 810 |
| 812 | 285.117-285.461 | 811 |
| 813 | 285.469-285.813 | 812 |
| 814 | 285.820-286.164 | 813 |
| 815 | 286.172-286.516 | 814 |
| 816 | 286.523-286.867 | 815 |
| 817 | 286.875-287.219 | 816 |
| 818 | 287.227-287.570 | 817 |
| 819 | 287.578-287.922 | 818 |
| 820 | 287.930-288.273 | 819 |
| 821 | 288.281-288.625 | 820 |
| 822 | 288.633-288.977 | 821 |
| 823 | 288.984-289.328 | 822 |
| 824 | 289.336-289.680 | 823 |
| 825 | 289.688-290.031 | 824 |
| 826 | 290.039-290.383 | 825 |
| 827 | 290.391-290.734 | 826 |
| 828 | 290.742-291.086 | 827 |
| 829 | 291.094-291.438 | 828 |
| 830 | 291.445-291.789 | 829 |
| 831 | 291.797-292.141 | 830 |
| 832 | 292.148-292.492 | 831 |
| 833 | 292.5-292.844 | 832 |
| 834 | 292.852-293.195 | 833 |
| 835 | 293.203-293.547 | 834 |
| 836 | 293.555-293.898 | 835 |
| 837 | 293.906-294.25 | 836 |
| 838 | 294.258-294.602 | 837 |
| 839 | 294.609-294.953 | 838 |
| 840 | 294.691-295.305 | 839 |
| 841 | 295.313-295.656 | 840 |
| 842 | 295.664-296.008 | 841 |
| 843 | 296.016-296.359 | 842 |
| 844 | 296.367-296.711 | 843 |
| 845 | 296.719-297.063 | 844 |
| 846 | 297.070-297.414 | 845 |
| 847 | 297.422-297.766 | 846 |
| 848 | 297.773-298.117 | 847 |
| 849 | 298.125-298.469 | 848 |
| 850 | 298.477-298.820 | 849 |
| 851 | 298.828-299.172 | 850 |
| 852 | 299.180-299.523 | 851 |
| 853 | 299.531-299.875 | 852 |
| 854 | 299.883-300.227 | 853 |
| 855 | 300.234-300.578 | 854 |
| 856 | 300.586-300.930 | 855 |
| 857 | 300.938-301.281 | 856 |
| 858 | 301.289-301.633 | 857 |
| 859 | 301.641-301.984 | 858 |
| 860 | 301.992-302.336 | 859 |
| 861 | 302.344-302.688 | 860 |
| 862 | 302.695-303.039 | 861 |
| 863 | 303.047-303.391 | 862 |
| 864 | 303.398-303.742 | 863 |
| 865 | 303.75-304.094 | 864 |
| 866 | 304.102-304.445 | 865 |
| 867 | 304.453-304.797 | 866 |
| 868 | 304.805-305.148 | 867 |
| 869 | 305.156-305.5 | 868 |
| 870 | 305.508-305.852 | 869 |
| 871 | 305.859-306.203 | 870 |
| 872 | 306.211-306.555 | 871 |
| 873 | 306.563-306.906 | 872 |
| 874 | 306.914-307.258 | 873 |
| 875 | 307.266-307.609 | 874 |
| 876 | 307.617-307.961 | 875 |
| 877 | 307.969-308.313 | 876 |
| 878 | 308.320-308.664 | 877 |
| 879 | 308.672-309.016 | 878 |
| 880 | 309.023-309.367 | 879 |
| 881 | 309.375-309.719 | 880 |
| 882 | 309.727-310.070 | 881 |
| 883 | 310.078-310.422 | 882 |
| 884 | 310.430-310.773 | 883 |
| 885 | 310.781-311.125 | 884 |
| 886 | 311.133-311.477 | 885 |
| 887 | 311.484-311.828 | 886 |
| 888 | 311.836-312.180 | 887 |
| 889 | 312.188-312.531 | 888 |
| 890 | 312.539-312.883 | 889 |
| 891 | 312.891-313.234 | 890 |
| 892 | 313.242-313.586 | 891 |
| 893 | 313.594-313.938 | 892 |
| 894 | 313.945-314.289 | 893 |
| 895 | 314.297-314.641 | 894 |
| 896 | 314.648-314.992 | 895 |
| 897 | 315-315.344 | 896 |
| 898 | 315.352-315.695 | 897 |
| 899 | 315.703-316.047 | 898 |
| 900 | 316.055-316.398 | 899 |
| 901 | 316.406-316.75 | 900 |
| 902 | 316.758-317.102 | 901 |

TABLE 8-continued 1024-bit (1k) Division

| Integer sent to processor | logical head location (degrees from center) | Head (one to one physical to logical correlation) |
|---|---|---|
| 903 | 317.109-317.453 | 902 |
| 904 | 317.461-317.805 | 903 |
| 905 | 317.813-318.156 | 904 |
| 906 | 318.164-318.508 | 905 |
| 907 | 318.516-318.859 | 906 |
| 908 | 318.867-319.211 | 907 |
| 909 | 319.219-319.563 | 908 |
| 910 | 319.570-319.914 | 909 |
| 911 | 319.922-320.266 | 910 |
| 912 | 320.273-320.617 | 911 |
| 913 | 320.625-320.969 | 912 |
| 914 | 320.977-321.320 | 913 |
| 915 | 321.328-321.672 | 914 |
| 916 | 321.680-322.023 | 915 |
| 917 | 322.031-322.375 | 916 |
| 918 | 322.383-322.727 | 917 |
| 919 | 322.734-323.078 | 918 |
| 920 | 323.086-323.430 | 919 |
| 921 | 323.438-323.781 | 920 |
| 922 | 323.789-324.133 | 921 |
| 923 | 324.141-324.484 | 922 |
| 924 | 324.492-324.836 | 923 |
| 925 | 324.844-325.188 | 924 |
| 926 | 325.195-325.539 | 925 |
| 927 | 325.547-325.891 | 926 |
| 928 | 325.898-326.242 | 927 |
| 929 | 326.25-326.594 | 928 |
| 930 | 326.602-326.945 | 929 |
| 931 | 326.953-327.297 | 930 |
| 932 | 327.305-327.648 | 931 |
| 933 | 327.656-328 | 932 |
| 934 | 328.008-328.352 | 933 |
| 935 | 328.359-328.703 | 934 |
| 936 | 328.711-329.055 | 935 |
| 937 | 329.063-329.406 | 936 |
| 938 | 329.414-329.758 | 937 |
| 939 | 329.766-330.109 | 938 |
| 940 | 330.117-330.461 | 939 |
| 941 | 330.469-330.813 | 940 |
| 942 | 330.820-331.164 | 941 |
| 943 | 331.172-331.516 | 942 |
| 944 | 331.523-331.867 | 943 |
| 945 | 331.875-332.219 | 944 |
| 946 | 332.227-332.570 | 945 |
| 947 | 332.578-332.922 | 946 |
| 948 | 332.930-333.273 | 947 |
| 949 | 333.281-333.625 | 948 |
| 950 | 333.633-333.977 | 949 |
| 951 | 333.984-334.328 | 950 |
| 952 | 334.336-334.680 | 951 |
| 953 | 334.688-335.031 | 952 |
| 954 | 335.039-335.383 | 953 |
| 955 | 335.391-335.734 | 954 |
| 956 | 335.742-336.086 | 955 |
| 957 | 336.094-336.438 | 956 |
| 958 | 336.445-336.789 | 957 |
| 959 | 336.797-337.141 | 958 |
| 960 | 337.148-337.492 | 959 |
| 961 | 337.5-337.844 | 960 |
| 962 | 337.852-338.195 | 961 |
| 963 | 338.203-338.547 | 962 |
| 964 | 338.555-338.898 | 963 |
| 965 | 338.906-339.25 | 964 |
| 966 | 339.258-339.602 | 965 |
| 967 | 339.609-339.953 | 966 |
| 968 | 339.961-340.305 | 967 |
| 969 | 340.313-340.656 | 968 |
| 970 | 340.664-341.008 | 969 |
| 971 | 341.016-341.359 | 970 |
| 972 | 341.367-341.711 | 971 |
| 973 | 341.719-342.063 | 972 |
| 974 | 342.070-342.414 | 973 |
| 975 | 342.422-342.766 | 974 |
| 976 | 342.773-343.117 | 975 |
| 977 | 343.125-343.469 | 976 |
| 978 | 343.477-343.820 | 977 |
| 979 | 343.828-344.172 | 978 |
| 980 | 344.180-344.523 | 979 |
| 981 | 344.531-344.875 | 980 |
| 982 | 344.883-345.227 | 981 |
| 983 | 345.234-345.578 | 982 |
| 984 | 345.586-345.930 | 983 |
| 985 | 345.938-346.281 | 984 |
| 986 | 346.289-346.633 | 985 |
| 987 | 346.641-346.984 | 986 |
| 988 | 346.992-347.336 | 987 |
| 989 | 347.344-347.688 | 988 |
| 990 | 347.695-348.039 | 989 |
| 991 | 348.047-348.391 | 990 |
| 992 | 348.398-348.742 | 991 |
| 993 | 348.75-349.094 | 992 |
| 994 | 349.102-349.445 | 993 |
| 995 | 349.453-349.797 | 994 |
| 996 | 349.805-350.148 | 995 |
| 997 | 350.156-350.5 | 996 |
| 998 | 350.508-350.852 | 997 |
| 999 | 350.859-351.203 | 998 |
| 1000 | 351.211-351.555 | 999 |
| 1001 | 351.563-351.906 | 1000 |
| 1002 | 351.914-352.258 | 1001 |
| 1003 | 352.266-352.609 | 1002 |
| 1004 | 352.617-352.961 | 1003 |
| 1005 | 352.969-353.313 | 1004 |
| 1006 | 353.320-353.664 | 1005 |
| 1007 | 353.672-354.016 | 1006 |
| 1008 | 354.023-354.367 | 1007 |
| 1009 | 354.375-354.719 | 1008 |
| 1010 | 354.727-355.070 | 1009 |
| 1011 | 355.078-355.422 | 1010 |
| 1012 | 355.430-355.773 | 1011 |
| 1013 | 355.781-356.125 | 1012 |
| 1014 | 356.133-356.477 | 1013 |
| 1015 | 356.484-356.828 | 1014 |
| 1016 | 356.836-357.180 | 1015 |
| 1017 | 357.188-357.531 | 1016 |
| 1018 | 357.539-357.883 | 1017 |
| 1019 | 357.891-358.234 | 1018 |
| 1020 | 358.242-358.586 | 1019 |
| 1021 | 358.594-358.938 | 1020 |
| 1022 | 358.945-359.289 | 1021 |
| 1023 | 359.297-359.641 | 1022 |
| 1024 | 359.648-359.992 | 1023 |

What is claimed is:

1. An optical disc containing information units arranged spirally from the disc center to the outer radial edge of the disc which are uniform in shape and size, with each unit containing a reflective pad which is raised from the disc surface, rather than sunken into the disc as a pit, designed to reflect incident light away from the surface of the disc in the shape of a straight line at an angle of 45 degrees from the disc surface and at one of 1024 preset angles between 0 degrees and 360 degrees from the center of the light source with 0 degrees oriented radially towards the center of the disc.

2. An optical apparatus for reproducing data from the disc noted in claim 1, comprised of:

a laser light source that moves in a radial path along the underside of the optical disc as the disc spins in a circumferential direction, and which laser light source irradiates the raised pads in the informational units on the surface of the optical disc to produce reflections in one of 1024 preset angles;

a laser light detecting ring comprised of $2^{10}$ individual light detecting receptors arranged circumferentially around the laser light source and also attached to the laser light source so as to move with said source, remaining at a constant distance from both the light source and the disc surface as the light source moves in its radial path allowing the laser light receptors in the ring to be irradiated as light is reflected from the raised pads in the informational units on the disc; and a processor capable of determining which receptor is irradiated by the reflected light from each information unit, and outputting a data value between 1 and 1024 accordingly.

3. An apparatus according to claim 2, where $2^{10}/x$ (where x is an integer whose value is 128, 64, 32, 16, 8, 4, or 2) contiguous receptors in the laser light detecting ring are interpreted by the processor as being a single, logical receptor thereby dynamically combining adjacent receptors to form 8, 16, 32, 64, 128, 256, or 512 logical receptors from the 1024 physical receptors so that when any light detecting receptor of a contiguous group is irradiated by reflected light, the output from the processor is the same.

* * * * *